US011613665B2

(12) United States Patent
Utsugi et al.

(10) Patent No.: US 11,613,665 B2
(45) Date of Patent: Mar. 28, 2023

(54) WATER-BASED INK FOR INKJET AND METHOD FOR PRODUCING PRINTED MATTER

(71) Applicants: TOYO INK SC HOLDINGS CO., LTD., Tokyo (JP); TOYOCOLOR CO. LTD., Tokyo (JP)

(72) Inventors: Masayoshi Utsugi, Tokyo (JP); Atsushi Yoda, Tokyo (JP); Masahiro Sugihara, Tokyo (JP); Kazuhiro Jonai, Tokyo (JP); Norio Suzuki, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 710 days.

(21) Appl. No.: 16/614,475

(22) PCT Filed: Apr. 17, 2018

(86) PCT No.: PCT/JP2018/015868
§ 371 (c)(1),
(2) Date: Nov. 18, 2019

(87) PCT Pub. No.: WO2018/221045
PCT Pub. Date: Dec. 6, 2018

(65) Prior Publication Data
US 2020/0199387 A1 Jun. 25, 2020

(30) Foreign Application Priority Data

May 30, 2017 (JP) ................. 2017-106614

(51) Int. Cl.
| | |
|---|---|
| *C09D 11/324* | (2014.01) |
| *C08K 3/013* | (2018.01) |
| *B41J 2/01* | (2006.01) |
| *C08K 3/04* | (2006.01) |
| *C08K 5/00* | (2006.01) |
| *C08K 5/053* | (2006.01) |
| *C08K 5/5419* | (2006.01) |
| *C08L 25/08* | (2006.01) |
| *C08L 33/06* | (2006.01) |
| *C08L 33/08* | (2006.01) |
| *C08L 33/10* | (2006.01) |
| *C08L 53/00* | (2006.01) |

(52) U.S. Cl.
CPC .............. *C09D 11/324* (2013.01); *B41J 2/01* (2013.01); *C08K 3/013* (2018.01); *C08K 3/04* (2013.01); *C08K 5/0041* (2013.01); *C08K 5/053* (2013.01); *C08K 5/5419* (2013.01); *C08L 25/08* (2013.01); *C08L 33/064* (2013.01); *C08L 33/08* (2013.01); *C08L 33/10* (2013.01); *C08L 53/00* (2013.01); *C08K 2201/005* (2013.01)

(58) Field of Classification Search
CPC .... C08K 3/013; C08K 5/0041; C08K 5/5419; C08K 5/053; C08K 3/04; C08K 2201/005; C09D 11/107; C09D 11/322; C09D 11/324; C09D 11/106; C08L 33/08; C08L 33/10; C08L 33/064; C08L 53/00; C08L 25/08; B41M 5/00; B41J 2/01
See application file for complete search history.

(56) References Cited

U.S. PATENT DOCUMENTS

| | | | |
|---|---|---|---|
| 9,102,777 B2 | 8/2015 | Shimanaka et al. | |
| 2005/0004263 A1* | 1/2005 | Gould | C09D 11/30 523/160 |
| 2010/0143590 A1 | 6/2010 | Held et al. | |
| 2012/0127233 A1 | 5/2012 | Yamashita et al. | |
| 2013/0338273 A1* | 12/2013 | Shimanaka | C08F 299/0414 524/496 |

FOREIGN PATENT DOCUMENTS

| | | |
|---|---|---|
| EP | 2 990 441 A1 | 3/2016 |
| JP | 2007-505203 A | 3/2007 |
| JP | 2008-169272 A | 7/2008 |
| JP | 2008-184547 A | 8/2008 |
| JP | 2010-248357 A | 11/2010 |
| JP | 2011-094082 A | 5/2011 |
| JP | 2011-225834 A | 11/2011 |
| JP | 2012-036251 A | 2/2012 |
| JP | 2012-193249 A | 10/2012 |
| JP | 2014-015541 A | 1/2014 |
| JP | 2016-010931 A | 1/2016 |
| JP | 2017-031287 A | 2/2017 |
| WO | 2004/104119 A1 | 12/2004 |
| WO | 2012/124212 A1 | 9/2012 |

OTHER PUBLICATIONS

Extended European Search Report dated Apr. 28, 2020, from the European Patent Office in Application No. 18810380.8.
Office Action for corresponding JP 2017-106614, dated Apr. 10, 2018.
International Search Report for PCT/JP2018/015868, dated Jun. 26, 2018.

* cited by examiner

*Primary Examiner* — Angela C Scott
(74) *Attorney, Agent, or Firm* — Sughrue Mion, PLLC

(57) ABSTRACT

One embodiment relates to a water-based ink for an inkjet containing a pigment, a fixing resin, an organic solvent and water, wherein the fixing resin includes an A-B block polymer having an A block and a B block, the A block contains a structural unit (P-1) having an anionic functional group, and the acid value of the A-B block polymer is from 5 to 80 mgKOH/g.

9 Claims, No Drawings

WATER-BASED INK FOR INKJET AND METHOD FOR PRODUCING PRINTED MATTER

CROSS REFERENCE TO RELATED APPLICATIONS

This application is a National Stage of International Application No. PCT/JP2018/015868 filed Apr. 17, 2018, claiming priority based on Japanese Patent Application No. 2017-106614 filed May 30, 2017.

TECHNICAL FIELD

Embodiments of the present disclosure relate to a water-based ink for an inkjet, a method for producing printed matter, and printed matter.

BACKGROUND ART

Inkjet recording systems are recording systems in which ink droplets are discharged from extremely fine nozzles directly onto a printing substrate, and the ink droplets are adhered to the substrate to obtain text or images. Using this type of system not only has the advantages that the noise from the apparatus used is minor and the operability is favorable, but also offers the advantages of simple color production and the ability to use plain paper as the printing substrate, and therefore inkjet printing has become widely used in output devices in offices and households.

On the other hand, even in industrial applications, improvements in inkjet technology mean that the use of inkjet printers as digital printing output devices is expected to increase, and in actual fact, printing devices for printing solvent inks or UV inks to plastic substrates such as polyvinyl chloride and polyethylene terephthalate (PET) are now commercially available. However, in recent years, as a result of measures designed to reduce the load on operators and the environment, the demand for water-based inks is growing.

Water-based inks for inkjets have conventionally been developed for printing to plain paper or specialty papers such as photographic glossy papers. However, in recent years, as mentioned above, expectations have grown for an expansion in the potential applications for inkjet recording systems, which has resulted in increased demands for direct printing to coated papers such as typical coated papers and art papers, and plastic films such as polyvinyl chloride, PET, polypropylene (PP) and polyethylene (PE). In the case of plain papers and specialty papers, image formation is achieved by absorption of the liquid droplets within the interior of the paper, and therefore if conventional water-based inks for inkjets are printed onto the types of coated papers or plastic films mentioned above, then the ink is not fixed, and images having markedly inferior image quality are obtained.

In order to address the issues described above, the applicants of the present invention have previously proposed, in Patent Literature 1, a water-based ink for an inkjet containing an organic solvent having a specific solubility parameter. However, this specific solubility parameter considered the affinity with plasticizers within the printing substrate, and there is a possibility that an improvement in image quality may be unachievable when the water-based ink is used with printing substrates that do not contain a plasticizer.

On the other hand, Patent Literature 2 discloses an ink that uses an acrylic-based copolymer resin in order to enable direct printing to coated papers. By using this method, the acrylic-based copolymer resin forms a film following printing, thereby enabling ink fixation on printing substrates having low water absorption, and also improving the rub fastness of the printed matter. However, this ink tends to be prone to drying and an increase in viscosity on the surface of the inkjet head when the printer is left in standby for a long period or only used for intermittent printing, meaning problems such as a deterioration in the decap properties and discharge stability are a concern.

Furthermore, Patent Literature 3 discloses an inkjet ink that employs a combination of a resin having a glass transition temperature of at least 90° C. and a resin having a glass transition temperature of not more than 40° C. However, the resin having a glass transition temperature of not more than 40° C. readily undergoes fixation at the interface of the inkjet head nozzles (the gas-liquid interface at the discharge ports of the nozzles), which is very likely to cause a deterioration in the decap properties. Further, a deterioration in the ink storage stability caused by fusion and aggregation of molecules of the resin having a glass transition temperature of not more than 40° C. within the ink is also a concern.

As outlined above, there currently does not exist a water-based ink for an inkjet which is capable of forming high-quality images with no voids or mixed color bleeding, as well as excellent water resistance and rub fastness, not only on conventionally used printing substrates such as plain paper and glossy papers, but also on impermeable substrates such as coated papers, art papers, polyvinyl chloride sheets, PET films and PP films, and which also exhibits excellent decap properties and discharge stability, and preferably also has excellent storage stability.

CITATION LIST

Patent Literature

PLT 1: JP 2010-248357 A
PLT 2: JP 2011-094082 A
PLT 3: JP 2008-184547 A

SUMMARY OF INVENTION

Technical Problem

Embodiments of the present invention have been developed to address the issues described above, and have an object of providing a water-based ink for an inkjet which is capable of forming high-quality images with no voids or mixed color bleeding, as well as excellent water resistance and rub fastness, not only on conventionally used printing substrates such as plain paper and glossy papers, but also on low-absorption substrates such as coated papers, art papers, polyvinyl chloride sheets, PET films and PP films, and which also exhibits excellent decap properties and discharge stability. Further, another object of embodiments of the present invention is to provide a water-based ink for an inkjet which, in addition to the above properties, also exhibits excellent storage stability. An object of another embodiment of the present invention is to provide a method for producing printed matter that is capable of producing high-quality printed matter. Moreover, an object of yet another embodiment of the present invention is to provide high-quality printed matter.

Solution to Problem

As a result of intensive research, the inventors of the present invention discovered that a water-based ink for an inkjet containing a pigment, a fixing resin, an organic solvent and water, wherein the fixing resin includes an A-B block polymer which is composed of an A block and a B block that are each one type of polymer selected from among a styrene-based polymer, a (meth)acrylic-based polymer and a styrene-(meth)acrylic-based polymer, contains a structural unit (P-1) having an anionic functional group, has a prescribed amount of structural units within the A block, and has a specific acid value, was able to address the issues described above, and they were therefore able to complete the present invention.

In other words, one embodiment of the present invention relates to a water-based ink for an inkjet containing a pigment, a fixing resin, an organic solvent and water, wherein the fixing resin includes an A-B block polymer having an A block and a B block, the A block contains a structural unit (P-1) having an anionic functional group, the A block and the B block are each, independently, a block containing one type of polymer selected from among a styrene-based polymer, a (meth)acrylic-based polymer and a styrene-(meth)acrylic-based polymer, the amount of structural units contained in the A block is 5 to 25 mol % of the total molar amount of structural units contained in the A-B block polymer, the amount of the structural unit (P-1) having an anionic functional group contained in the A block is at least 85 mol % of the total molar amount of the structural unit (P-1) having an anionic functional group contained in the A-B block polymer, and the acid value of the A-B block polymer is from 5 to 80 mgKOH/g.

Further, one embodiment of the present invention relates to the water-based ink for an inkjet described above, wherein the amount of the structural unit (P-1) having an anionic functional group contained in the A block is from 40 to 80% by weight of all the structural units contained in the A block.

Further, one embodiment of the present invention relates to either water-based ink for an inkjet described above, wherein the glass transition temperature (TgB) of the B block is from 70 to 100° C.

Further, one embodiment of the present invention relates to any one of the water-based inks for an inkjet described above, wherein the B block contains a structural unit (P-2) having an alkyl group of 8 to 30 carbon atoms and/or a structural unit (P-3) having an aromatic ring.

Further, one embodiment of the present invention relates to any one of the water-based inks for an inkjet described above, wherein the B block contains a structural unit having an alkyl group of 10 to 30 carbon atoms as the structural unit (P-2) having an alkyl group of 8 to 30 carbon atoms.

Further, one embodiment of the present invention relates to any one of the water-based inks for an inkjet described above, wherein the B block contains a styrene-based structural unit as the structural unit (P-3) having an aromatic ring.

Furthermore, one embodiment of the present invention relates to any one of the water-based inks for an inkjet described above, wherein the organic solvent contains a glycol ether and/or a 1,2-alkanediol of 3 or more carbon atoms.

Further, one embodiment of the present invention relates to any one of the water-based inks for an inkjet described above, wherein the water-based ink for an inkjet also contains a surfactant, and the surfactant includes a siloxane-based surfactant.

Furthermore, one embodiment of the present invention relates to a method for producing printed matter that includes printing any one of the water-based inks for an inkjet described above onto a substrate.

Moreover, one embodiment of the present invention relates to printed matter produced using the method for producing printed matter described above.

The disclosure of this application is related to the subject matter disclosed in prior Japanese Patent Application 2017-106614 filed on May 30, 2017, the entire contents of which are incorporated herein by reference.

Advantageous Effects of Invention

Embodiments of the present invention are able to provide a water-based ink for an inkjet which is capable of forming high-quality images with no voids or mixed color bleeding, as well as excellent water resistance and rub fastness, not only on conventionally used printing substrates such as plain paper and glossy papers, but also on low-absorption substrates such as coated papers, art papers, polyvinyl chloride sheets, PET films and PP films, and which also exhibits excellent decap properties and discharge stability. Further, embodiments of the present invention are also able to provide a water-based ink for an inkjet which, in addition to the above properties, also exhibits excellent storage stability. Furthermore, another embodiment of the present invention is able to provide a method for producing printed matter that is capable of producing high-quality printed matter. Moreover, yet another embodiment of the present invention is able to provide high-quality printed matter.

DESCRIPTION OF EMBODIMENTS

The present invention is describe below in detail using a series of preferred embodiments. However, the present invention is in no way limited by the following embodiments.

<Water-Based Ink for Inkjet>

A water-based ink for an inkjet according to an embodiment of the present invention (hereafter also referred to as "the present embodiment") can be used favorably for performing printing using an inkjet recording system, not only on conventionally used printing substrates such as plain paper and glossy papers, but also on low-absorption substrates such as coated papers, art papers, polyvinyl chloride sheets, PET films and PP films. In the present description, the water-based ink for an inkjet is also referred to as simply "the water-based ink" or "the ink". The components contained in the ink are described below in detail.

(Fixing Resin)

(A-B Block Polymer)

The fixing resin of the present embodiment contains an A-B block polymer having an A block and a B block, wherein the A block contains a structural unit (P-1) having an anionic functional group. The A block and the B block are each, independently, a block containing one type of polymer selected from among a styrene-based polymer, a (meth)acrylic-based polymer and a styrene-(meth)acrylic-based polymer.

In one embodiment, the fixing resin used in the water-based ink for an inkjet contains an A-B block polymer that is composed of an A block and a B block and contains a structural unit (P-1) having an anionic functional group. Each of the A block and the B block is one type of polymer selected from among a styrene-based polymer, a (meth)acrylic-based polymer and a styrene-(meth)acrylic-based polymer.

Further the molar amount of structural units contained in the A block is from 5 to 25 mol % of the total molar amount of structural units contained in the A-B block polymer, and the molar amount of the structural unit (P-1) having an anionic functional group contained in the A block is at least 85 mol % of the total molar amount of the structural unit (P-1) having an anionic functional group contained in the A-B block polymer. Moreover, the acid value of the A-B block polymer is from 5 to 80 mgKOH/g. The A block which has the majority of the structural unit (P-1) having an anionic functional group is strongly hydrophilic, whereas the B block is strongly hydrophobic.

The principles that enable the A-B block polymer to address the problems described above are thought to include the following. However, these principles are merely conjecture, and in no way limit the present invention. Firstly, by using the A-B block polymer in which the degrees of hydrophilicity and hydrophobicity differ between the blocks, the molecular chains of the B block are prevented from freely spreading and becoming intertwined within the water-based ink, meaning any increases in viscosity in a semi-dried state can be suppressed. Further, it is thought that the ink in a semi-dried state exhibits excellent redissolution properties due to the A block. As a result, when small breaks are taken between print jobs or intermittent discharge is performed, even if the water and solvent component volatilize at the interface with the inkjet head nozzles which are temporarily not being used, discharge faults are unlikely to occur, and the decap properties are favorable. Furthermore, even in those cases where ink in a semi-dried state adheres to the nozzle surfaces, favorable discharge stability can be maintained, without problems such as nozzle blockages and flight curving of the ink droplets.

Moreover, it is also thought that after the ink has been discharged and adhered to the substrate, the A-B block polymer functions like a surfactant. In other words, the A-B block polymer orients at the gas-liquid interface, thereby suppressing coalescence of adjacent ink droplets. Furthermore, because of a reduction in the surface free energy of the ink, the wet spreadability on the substrate improves. It is thought that, as a result, high-quality images having no voids or mixed color bleeding can be obtained.

On the other hand, depending on the structure of the A-B block polymer, there is a possibility of a deterioration in the water resistance and rub fastness of the image obtained following complete volatilization of the water and the solvent component. As a result of intensive investigation, the inventors of the present invention discovered that by ensuring that the size of the A block and the acid value of the A-B block polymer fell within preferred ranges, and deterioration in the water resistance and rub fastness of the image could be suppressed while maintaining favorable decap properties, discharge stability and image quality. In other words, by ensuring that the molar amount of structural units contained in the A block is from 5 to 25 mol % of the total molar amount of structural units contained in the A-B block polymer, and that the acid value of the A-B block polymer is from 5 to 80 mgKOH/g, the balance between the hydrophilicity of the A block and the hydrophobicity of the B block is favorable.

As described above, by using a water-based ink for an inkjet that contains an A-B block polymer having a prescribed molar amount of structural units contained in the A block and having a specific acid value, high-quality images having excellent water resistance and rub fastness and no voids or mixed color bleeding can be obtained, and the decap properties and discharge stability of the ink can also be improved.

The A block and the B block are distinguished on the basis of whether they are hydrophilic or hydrophobic. Specifically, the A block has a high abundance ratio of the structural unit (P-1) having an anionic functional group, whereas the B block either does not contain, or has a low abundance ratio of, the structural unit (P-1) having an anionic functional group. Generally, substances having a high abundance ratio of an anionic functional group have enhanced hydrophilicity, and therefore the A block is strongly hydrophilic, whereas the B block is strongly hydrophobic. Furthermore, specific examples of other methods for distinguishing the A block and the B block besides the abundance ratio of structural units include determining the acid value of each block as described below.

In one embodiment, the water-based ink for an inkjet is a water-based ink for an inkjet containing a pigment, a fixing resin, and organic solvent and water, wherein the fixing resin includes an A-B block polymer composed of an A block and a B block, the A block contains a structural unit (P-1) having an anionic functional group, the A block and the B block are each, independently, a block formed from one type of polymer selected from among a styrene-based polymer, a (meth)acrylic-based polymer and a styrene-(meth)acrylic-based polymer, the amount of structural units contained in the A block is from 5 to 25 mol % of the total molar amount of structural units contained in the A-B block polymer, the amount of the structural unit (P-1) having an anionic functional group contained in the A block is at least 85 mol % relative to the total molar amount of the structural unit (P-1) having an anionic functional group contained in the A-B block polymer, and the acid value of the A-B block polymer is from 5 to 80 mgKOH/g.

(Structural Unit (P-1) Having an Anionic Functional Group)

Conventionally known monomers may be freely used as the monomer that forms the structural unit (P-1) having an anionic functional group. In particular, selection of a monomer that does not have a cationic functional group and has only an anionic functional group is preferred. Examples of the anionic functional group include a carboxyl group, sulfonic acid group and phosphoric acid group, and among these, in terms of the decap properties and the discharge stability, selection of a carboxyl group is preferred.

Examples of the above monomer include, but are not particularly limited to, acrylic acid, methacrylic acid, carboxymethyl (meth)acrylate, carboxyethyl (meth)acrylate, acryloyloxyethylsuccinic acid, methacryloyloxyethylsuccinic acid, acryloyloxyethylphthalic acid, methacryloyloxyethylphthalic acid, acryloyloxyisobutyric acid, methacryloyloxyisobutyric acid, 2-sulfoethyl (meth)acrylate, acryloyloxyethylphosphonic acid, methacryloyloxyethylphosphonic acid, 2-(phosphonooxy)ethyl (meth)acrylate, styrenecarboxylic acid, styrenesulfonic acid, and styrenephosphonic acid.

Among these monomers, as mentioned above, selection of a monomer having a carboxyl group is preferred, and in terms of ensuring favorable reactivity during synthesis, making it easier to adjust the glass transition temperature and number average molecular weight of the obtained A-B block polymer, and also in terms of ease of availability and the like, acrylic acid and/or methacrylic acid is preferably selected.

In this description, the term "(meth)acrylate" means at least one type of compound selected from among the "acrylate" and the "methacrylate".

In one preferred embodiment, the anionic functional group of the structural unit (P-1) having an anionic functional group is neutralized by cationic substances. By neutralizing the anionic functional group with a cationic substance, the hydrophilicity of the A block, which contains the majority of the structural unit (P-1) having an anionic functional group, increases. Examples of the cationic substance include ammonia, organic amines such as propylamine, butylamine, triethylamine, pyridine and morpholine; alkanolamines such as monoethanolamine, diethanolamine, triethanolamine, dimethylaminoethanol and 2-amino-2-methylpropanol; polyoxyethylene alkylamines such as polyoxyethylene laurylamine and polyoxyethylene stearylamine; and metal hydroxides such as lithium hydroxide, sodium hydroxide, potassium hydroxide and calcium hydroxide. Among these, an organic amine and/or an alkanolamine is able to produce a further improvement in the water resistance of the printed matter, which is thought to be caused by the volatilization of the above components after printing, and is consequently preferred.

(Structural Unit Other than the Structural Unit (P-1) Having an Anionic Functional Group)

The monomer that forms a structural unit other than the structural unit (P-1) having an anionic functional group (hereafter also referred to as an "other structural unit") may also be selected freely from among conventionally known monomers. Most of this other structural unit is contained in the B block. Accordingly, from the viewpoint of achieving favorable hydrophobicity for the B block, the monomer that forms this other structural unit preferably does not contain a cationic functional group or an anionic functional group.

Examples of the above monomer include, but are not particularly limited to, styrene-based monomers such as styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-methoxystyrene, p-phenylstyrene and p-chlorostyrene;

alkyl group-containing (meth)acrylic-based monomers such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, lauryl (meth)acrylate, myristyl (meth)acrylate, cetyl (meth)acrylate, stearyl (meth)acrylate, arachyl (meth)acrylate, behenyl (meth)acrylate, lignoceryl (meth)acrylate, cerotoyl (meth)acrylate, montanyl (meth)acrylate, melissyl (meth)acrylate, dotriacontanoyl (meth)acrylate, tetratriacontanoyl (meth)acrylate and hexatriacontanoyl (meth)acrylate;

alkylene oxide chain-containing (meth)acrylic-based-based monomers such as (poly)ethylene glycol mono(meth)acrylate, (poly)propylene glycol mono(meth)acrylate, (poly)butylene glycol mono(meth)acrylate, (poly)(ethylene glycol-propylene glycol) mono(meth)acrylate, (poly)ethylene glycol mono(meth)acrylate monomethyl ether, (poly)ethylene glycol mono(meth)acrylate monobutyl ether, (poly)ethylene glycol mono(meth)acrylate monooctyl ether, (poly)ethylene glycol mono(meth)acrylate monobenzyl ether, (poly)ethylene glycol mono(meth)acrylate monophenyl ether, (poly)ethylene glycol mono(meth)acrylate monodecyl ether, (poly)ethylene glycol mono(meth)acrylate monododecyl ether, (poly)ethylene glycol mono(meth)acrylate monohexadecyl ether, and (poly)ethylene glycol mono(meth)acrylate monooctadecyl ether;

aromatic ring-containing (meth)acrylic-based monomers such as phenyl (meth)acrylate, benzyl (meth)acrylate and phenoxyethyl (meth)acrylate;

amino group-containing (meth)acrylic-based monomers such as dimethylaminoethyl (meth)acrylate and diethylaminoethyl (meth)acrylate;

polyfunctional styrene-based monomers such as divinylbenzene, diisopropenylbenzene and diisobutenylbenzene; and polyfunctional (meth)acrylic-based monomers such as diethylene glycol di(meth)acrylate, triethylene glycol di(meth)acrylate, 1,6-hexanediol di(meth)acrylate, neopentyl glycol di(meth)acrylate and trimethylolpropane tri(meth)acrylate.

Among these monomers, in terms of ensuring favorable reactivity during synthesis, making it easier to adjust the glass transition temperature and number average molecular weight of the obtained A-B block polymer, and also in terms of ease of availability and the like, the above monomer is preferably selected from the group consisting of styrene-based monomers such as styrene, p-methylstyrene and α-methylstyrene; and alkyl group-containing (meth)acrylic-based monomers such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, lauryl (meth)acrylate, myristyl (meth)acrylate, cetyl (meth)acrylate, stearyl (meth)acrylate, arachyl (meth)acrylate, behenyl (meth)acrylate, lignoceryl (meth)acrylate, cerotoyl (meth)acrylate, montanyl (meth)acrylate and melissyl (meth)acrylate.

The term "(meth)acrylic" means at least one type selected from among "acrylic" and "methacrylic".

In the water-based ink for an inkjet according to the present embodiment, an A-B block polymer produced by a conventionally known block polymer production method using the monomers described above can be used favorably. Among the various possibilities, in terms of being able to narrow the molecular weight distribution of the polymer, and more easily control that molecular weight distribution, use of an A-B block polymer produced by a living radical polymerization method is preferred. There are various living radical polymerization methods such as the NMP method, ATRP method, RAFT method and TERP method, and any of those methods may be selected.

Examples of known forms for the fixing resins generally used in water-based inks for inkjets include emulsions, water-soluble resins, and hydrosols which are an intermediate form between the other two. In this description, the term "emulsion" describes a form in which an emulsifier is adsorbed to the surfaces of resin microparticles to disperse the microparticles in a dispersion medium. Further, the term "hydrosol" describes a form in which the acidic and/or basic functional groups that exist within a resin exist in a neutralized state within a dispersion medium, and although having particle-like properties, is a form in which at least a portion of the surfaces of the resin particles are swollen and dissolved. In the water-based ink for an inkjet of the present embodiment, the A-B block polymer may adopt any of the above forms.

Among the above forms, emulsions and hydrosols contain higher molecular weight resins than water-soluble resins, can lower the viscosity of the ink, and because they enable larger amounts of resin to be included in the ink, are suitable for enhancing the water resistance and rub fastness of the printed matter. In one embodiment, in those cases where an A-B block polymer that adopts an emulsion or hydrosol form is used, the volume average particle size (D50) is preferably from 10 to 300 nm, and more preferably from 20 to 250 nm. Provided that the average particle size is at least 10 nm, printed matter having excellent water resistance and rub fastness can be obtained, and fusion of the A-B block polymer molecules within the ink does not occur, meaning an ink of excellent storage stability is obtained. Further, provided that the average particle size is not more than 300 nm, an ink having excellent discharge stability that does not cause blockages of the inkjet head nozzles can be obtained. The volume average particle size mentioned above represents the median diameter, and can be measured using a Nanotrac UPA EX-150, manufactured by MicrotracBEL Corporation, using a sample that has been diluted with water if necessary.

As mentioned above, the A-B block polymer used in the water-based ink for an inkjet according to the present embodiment may be in the form of an emulsion, a hydrosol or a water-soluble resin, but is preferably in the form of a hydrosol or a water-soluble resin. In one embodiment, in the case where the A-B block polymer is a hydrosol or a water-soluble resin, a polymer having a "loading index value" described below of 10 or less can be used favorably.

The "loading index value" is a value calculated from the total amount of scattered light when a laser light is irradiated onto an aqueous solution or dispersion of the A-B block polymer as a sample. In the case of a water-soluble resin, the entire A-B block polymer is dissolved in water, whereas in the case of a hydrosol, the surface of the A-B block polymer is swollen by and dissolved in water. Accordingly, it is thought that scattering of the laser light at the resin surface is weakened. In other words, the solubility of the A-B block polymer in water can be determined on the basis of the loading index value.

The "loading index value" can be confirmed, for example, by the method described below, using a Nanotrac UPA EX-150 manufactured by MicrotracBEL Corporation. First, under an environment at 25° C., using water as the dispersion medium, zero setting (background measurement) is performed. Next, an aqueous solution or dispersion of the A-B block polymer with a solid fraction concentration that has been adjusted to 10% by weight is placed in the sample cell of the above apparatus. After the surface of the aqueous solution or dispersion has settled, sample loading is performed, and the displayed loading index value is confirmed.

In one preferred embodiment, the amount of the A-B block polymer in the water-based ink for an inkjet, expressed as the equivalent non-volatile component, is preferably within a range from 1 to 15% by weight relative to the total weight of the water-based ink, and is more preferably within a range from 2 to 12.5% by weight, and particularly preferably from 3 to 10% by weight. By ensuring that the amount of the A-B block polymer falls within the above range, the decap properties and discharge stability are excellent, and the water resistance and rub fatness of the printed mater can be improved.

The water-based ink for an inkjet of the present embodiment may contain two or more types of A-B block polymer having different compositions.

As mentioned above, the acid value (AvP) of the A-B block polymer used in the water-based ink for an inkjet of the present embodiment is from 5 to 80 mgKOH/g, and is more preferably from 10 to 70 mgKOH/g, and even more preferably from 15 to 60 mgKOH/g. As mentioned above, A-B block polymers included within this acid value range have excellent balance between the hydrophilicity and the hydrophobicity, and are capable of achieving a combination of favorable decap properties and discharge stability, and superior image water resistance.

In this description, the "acid value" means the number of milligrams of potassium hydroxide required to neutralize the acidic component contained within a 1 g sample (mgKOH/g). The acid value of a polymer and the acid value of each of the blocks described below, may be calculated from the composition of a monomer(s) that form the polymer or block, or may be measured experimentally. In one example of a method of measuring the acid value experimentally, a solution of the sample is titrated with an ethanolic solution of potassium hydroxide (0.1 mol/L) using an automatic potentiometric titrator AT-710S manufactured by Kyoto Electronics Manufacturing Co., Ltd. Following completion of the titration, the acid value is calculated from the amount of the ethanolic solution added to reach the end point.

In one preferred embodiment, the glass transition temperature (TgP) of the A-B block polymer is preferably within a range from 60 to 120° C., more preferably from 65 to 110° C., and particularly preferably from 70 to 105° C. A-B block polymers included within this glass transition temperature range do not undergo fusion within the ink, and therefore an ink of excellent storage stability can be obtained. Further, the printed matter exhibits excellent toughness, enabling printed matter having favorable rub fastness to be obtained.

The glass transition temperature of the polymer and of each of the blocks described below may be calculated from the composition of a monomer(s) that form the polymer or block, or may be measured experimentally. One example of a method for calculating the glass transition temperature from the composition of a monomer(s) that form the polymer or block is the FOX equation represented by formula (1) shown below.

$$1/Tg = \Sigma(Wn/Tgn) \quad \text{Formula (1):}$$

In the above formula (1), Tg represents the glass transition temperature (K) of the polymer or block, Wn represents the mass fraction of each structural unit that forms the polymer or block, and Tgn represents the glass transition temperature (K) of a homopolymer of each structural unit. These Tgn values may, for example, use the values disclosed in "Polymer Handbook (fourth edition)" edited by J. Brandrup et al., published by John Wiley & Sons, Inc., 1998.

Further, one example of a method for experimentally measuring the glass transition temperature of the polymer and each block involves conducting a thermal analysis of a sample of about 10 mg under conditions including a nitrogen atmosphere and a rate of temperature increase of 10° C./minute, using a differential scanning calorimeter DSC-60 Plus manufactured by Shimadzu Corporation. Following completion of the measurement, the glass transition temperature may be read from the obtained DSC curve.

In one embodiment, the number average molecular weight (MnP) of the A-B block polymer is preferably within a range from 3,000 to 30,000, more preferably from 4,000 to 28,000, and even more preferably from 5,000 to 26,000. Provided the number average molecular weight is at least 3,000, printed matter having superior water resistance and rub fastness can be obtained, whereas provided the number average molecular weight is not more than 30,000, an ink having excellent discharge stability can be obtained.

Moreover, in one embodiment, the A-B block polymer has a ratio (Mw/Mn) of the weight average molecular weight (Mw) relative to the above number average molecular weight (Mn) that is preferably from 1.0 to 2.5, and particularly preferably from 1.0 to 2.0. An A-B block polymer that satisfies this range has only a small proportion of high-molecular weight components that may lower the water resistance and rub fastness of the printed matter, meaning printed matter having superior properties can be obtained. Further, the proportion of low-molecular weight components that may have an adverse effect on the storage stability, meaning an ink having superior storage stability can be obtained.

The number average molecular weight, the weight average molecular weight, and the ratio therebetween for the A-B block polymer and each of the blocks described below can be measured using typical methods. For example, these values can be measured using a gel permeation chromatograph (HLC-8220 manufactured by Tosoh Corporation) fitted with an RI (refractive index) detector and a TSKgel column manufactured by Tosoh Corporation. By using THF as the eluent, and using a calibration curve prepared using a number of polystyrene standard samples, the molecular weight distribution of a sample can be calculated.

(A Block)

As described above, the A block contains the structural unit (P-1) having an anionic functional group in an amount that represents at least 85 mol % of the total molar amount of the structural unit (P-1) having an anionic functional group contained in the A-B block polymer, and exhibits hydrophilicity. From the viewpoints of ensuring a clear distinction between the hydrophilicity of the A block and the hydrophobicity of the B block, and ensuring that the orientation function at the ink liquid droplet interface manifests favorably, the molar amount of the structural unit (P-1) having an anionic functional group contained in the A block is more preferably at least 90 mol %, and even more preferably 95 mol % or more, of the total molar amount of the structural unit (P-1) having an anionic functional group contained in the A-B block polymer.

Further, as mentioned above, the molar amount of structural units contained in the A block relative to the total molar amount of structural units contained in the A-B block polymer is from 5 to 25 mol %, preferably from 5 to 20 mol %, and more preferably from 5 to 16 mol %. By ensuring this molar amount falls within the above range, the decap properties of the ink can be improved, and the orientation function at the ink liquid droplet interface manifests more favorably, meaning voids and mixed color bleeding in the printed matter can be prevented.

The A block may also include a structural unit other than the structural unit (P-1) having an anionic functional group. In such cases, the weight of the structural unit (P-1) having an anionic functional group in the A block relative to the weight of all the structural units contained in the A block is preferably from 40 to 80% by weight, more preferably from 40 to 75% by weight, and even more preferably from 45 to 70% by weight. Provided the weight ratio of the structural unit (P-1) having an anionic functional group in the A block falls within the above range, the A block exhibits favorable hydrophilicity, and therefore the redissolution properties when in a semi-dried state are excellent, and the decap properties and discharge stability also improve.

The monomer(s) that form the structural units contained in the A block may be one type of compound, or two or more types of compounds, selected from among the compounds described above. Among these compounds, from the viewpoints described above, a monomer having a carboxyl group may be selected favorably as the structural unit (P-1) having an anionic functional group. Further, in terms of ease of availability of the material, in terms of ensuring favorable reactivity during synthesis, and in terms of enabling the acid value and glass transition temperature of the A block to satisfy the preferred ranges described below, acrylic acid and/or methacrylic acid may be selected favorably.

Further, in terms of ease of availability of the material, and in terms of enabling the glass transition temperature and the number average molecular weight of the A block to satisfy the preferred ranges described below, the monomer that forms the other structural unit is preferably at least one type of monomer selected from among a styrene-based monomer, an alkyl group-containing (meth)acrylic-based monomer having an alkyl group of less than 8 carbon atoms, and an ethylene oxide chain-containing (meth)acrylic-based monomer. Among these monomers, in terms of ensuring favorable reactivity during synthesis, and in terms of enabling the glass transition temperature of the A block to satisfy the particularly preferred range described below, an alkyl group-containing (meth)acrylic-based monomer having an alkyl group of 4 or fewer carbon atoms may be selected favorably.

In one preferred embodiment, the acid value (AvA) of the A block is preferably within a range from 150 to 600 mgKOH/g, more preferably from 200 to 530 mgKOH/g, and even more preferably from 250 to 460 mgKOH/g. A blocks included in this acid value range have particularly favorable hydrophilicity, and can improve the decap properties and the discharge stability. The acid value of the A block can be calculated or measured using the methods described above.

Further, in one preferred embodiment, the glass transition temperature (TgA) of the A block is preferably within a range from 50 to 120° C., more preferably from 60 to 120° C., and even more preferably from 70 to 120° C. The A block is strongly hydrophilic, and in the ink, is thought to exist in a state that coats the B block. A blocks included in the above glass transition temperature range have favorable toughness, and therefore molecules of the A-B block polymer do not undergo fusion within the ink, and an ink of excellent storage stability and discharge stability can be obtained. The glass transition temperature of the A block can be calculated or measured using the methods described above.

Furthermore, in one embodiment, the number average molecular weight (MnA) of the A block is preferably within a range from 350 to 5,000, more preferably from 400 to 4,000, and particularly preferably from 500 to 3,000. Provided the ink uses an A-B block polymer containing an A block having a number average molecular weight that falls within this range, the water resistance and rub fastness of the printed matter improve, and the orientation function at the ink droplet interface manifests more favorably, meaning voids and mixed color bleeding in the printed matter can be prevented. The number average molecular weight of the A block can be measured using the method described above.

(B Block)

The B block contained in the A-B block polymer has an amount of the structural unit (P-1) having an anionic functional group that is not more than 15 mol % of the total molar amount of the structural unit (P-1) having an anionic functional group, and exhibits hydrophobicity. From the viewpoints of ensuring a clear distinction between the hydrophilicity of the A block and the hydrophobicity of the B block, and ensuring that the orientation function at the ink liquid droplet interface manifests favorably, the molar amount of the structural unit (P-1) having an anionic functional group contained in the B block is more preferably not more than 10 mol %, and even more preferably 5 mol % or less, of the total molar amount of the structural unit (P-1) having an anionic functional group contained in the A-B block polymer. The molar amount of the structural unit (P-1) having an anionic functional group in the B block may be 0 mol % of the total molar amount of the structural unit (P-1) having an anionic functional group. Further, as described below, it is preferable that the molar amount of the structural unit (P-1) having an anionic functional group in the B block is 0 mol %, namely that the B block contains substantially none of the structural unit (P-1) having an anionic functional group.

In those cases where the B block contains the structural unit (P-1) having an anionic functional group, the weight of that structural unit (P-1) relative to the weight of all of the structural units contained in the B block is preferably not more than 30% by weight, more preferably not more than 20% by weight, and even more preferably 10% by weight or less. Provided the weight proportion of the structural unit (P-1) having an anionic functional group contained in the B block falls within the above range, the B block exhibits excellent hydrophobicity, and therefore the water resistance and rub fastness of the printed matter improves. Moreover, the hydrophilicity of the A block and the hydrophobicity of the B block can be clearly distinguished, and the orientation function at the ink liquid droplet interface is able to manifest more favorably. The weight of the structural unit (P-1) having an anionic functional group contained in the B block may be 0% by weight relative to the weight of all of the structural units contained in the B block. Further, as described below, it is preferable that the weight of the structural unit (P-1) having an anionic functional group in the B block is 0% by weight, namely that the B block contains substantially none of the structural unit (P-1) having an anionic functional group.

Furthermore, for the reasons outlined above, in the A-B block polymer used in the water-based ink for an inkjet that represents an embodiment of the present invention, it is particularly preferable that the B block contains substantially none of the structural unit (P-1) having an anionic functional group. In this description, the expression "contains substantially none" means that none of the subject material is intentionally added, but does not exclude, for example, the existence of the material as an impurity or by-product. Specifically, the amount of the structural unit (P-1) having an anionic functional group included unintentionally in the B block is preferably not more than 5% by weight, more preferably not more than 3% by weight, and particularly preferably 1% by weight or less, of the weight of all of the structural units contained in the B block.

The monomer(s) that form the structural units contained in the B block may be one type of compound, or two or more types of compounds, selected from among the compounds described above. Among these compounds, in those cases where the B block contains the structural unit (P-1) having an anionic functional group, in terms of ease of availability, and in terms of enabling the glass transition temperature and number average molecular weight of the B block to fall within the preferred ranges described below, a monomer having a carboxyl group may be selected favorably as the structural unit (P-1) having an anionic functional group, and acrylic acid and/or methacrylic acid may be selected particularly favorably.

Further, in terms of ease of availability of the material, in terms of ensuring favorable hydrophobicity for the B block, and in terms of enabling the glass transition temperature and the number average molecular weight of the B block to fall within the preferred ranges described below, the monomer that forms the other structural unit preferably includes a monomer having an alkyl group of 8 to 30 carbon atoms and/or a monomer having an aromatic ring such as a styrene-based monomer or an aromatic ring-containing (meth)acrylic-based monomer. In other words, in one preferred embodiment, the B block contains a structural unit (P-2) having an alkyl group of 8 to 30 carbon atoms and/or a structural unit (P-3) having an aromatic ring.

Of the various possibilities, in those cases where the monomer(s) that form the structural units contained in the B block include a monomer having an alkyl group of 8 to 30 carbon atoms, the hydrophobicity of the B block is particularly favorable, and the orientation function at the ink liquid droplet interface is able to manifest favorably. From these viewpoints, a monomer having an alkyl group of 10 to 30 carbon atoms is more preferred, a monomer having an alkyl group of 12 to 28 carbon atoms is even more preferred, and a monomer having an alkyl group of 18 to 24 carbon atoms is particularly desirable. Furthermore, in those cases where the monomer(s) that form the structural units contained in the B block include a monomer having an aromatic ring, in terms of ensuring favorable reactivity during synthesis, and in terms of ensuring a particularly favorable glass transition temperature for the B block, thus enabling improvements in the water resistance and the rub fastness of the printed matter, inclusion of a styrene-based monomer is preferred.

In the case of an embodiment in which the B block contains substantially none of the structural unit (P-1) having an anionic functional group, the B block itself may have a block structure.

In one preferred embodiment, the acid value (AvB) of the B block is preferably within a range from 0 to 50 mgKOH/g, more preferably from 0 to 35 mgKOH/g, and even more preferably from 0 to 20 mgKOH/g. B blocks included in this acid value range have favorable hydrophobicity, and enable a clear distinction between the hydrophilicity of the A block and the hydrophobicity of the B block, meaning the orientation function at the ink liquid droplet interface is able to manifest favorably. Further, the water resistance of the printed matter can also be improved. The acid value of the B block can be calculated or measured using the methods described above.

Further, in one preferred embodiment, the glass transition temperature (TgB) of the B block is preferably within a range from 70 to 110° C., more preferably from 75 to 110° C., and even more preferably from 80 to 110° C. B blocks included in this glass transition temperature range improve the toughness of the printed matter, and enable a particular improvement in the rub fastness of the printed matter. The glass transition temperature of the B block can be calculated or measured using the methods described above.

Furthermore, in one embodiment, the number average molecular weight (MnB) of the B block is preferably within a range from 2,650 to 25,000, more preferably from 3,500 to 23,000, even more preferably from 4,500 to 21,000, and particularly preferably from 5,000 to 20,000. In an A-B block polymer containing a B block having the above type of number average molecular weight, the balance between the hydrophilicity of the A block and the hydrophobicity of the B Block is particularly favorable. As a result, in an ink that uses the A-B block polymer, a combination of favorable decap properties and discharge stability, and superior water resistance and rub fastness of the printed matter can be achieved. The number average molecular weight of the B block can be calculated, for example, by subtracting the number average molecular weight of the A block from the number average molecular weight of the A-B block polymer.

Furthermore, in one embodiment, the amine value of the B block is preferably within a range from 0 to 10 mgKOH/g, more preferably from 0 to 5 mgKOH/g, and even more preferably from 0 to 2 mgKOH/g. B blocks having this type of amine value have favorable hydrophobicity, and enable a clear distinction between the hydrophilicity of the A block and the hydrophobicity of the B block, meaning the orientation function at the ink liquid droplet interface is able to manifest favorably. The amine value of the B block may be calculated from the composition of a monomer(s) that form the B block, or may be determined by measurement using the titration method prescribed in JIS K 7237.

(Fixing Resin Other than the A-B Block Polymer)

In addition to the A-B block polymer, the water-based ink for an inkjet of an embodiment of the present invention may also contain a conventionally known resin as another fixing resin.

In one embodiment, at least one type of polymer selected from among a styrene-based polymer, a (meth)acrylic-based polymer and a styrene-(meth)acrylic-based polymer (hereafter also referred to as an "other (styrene-) (meth)acrylic-based resin") is included as a fixing resin other than the A-B block polymer. These resins are preferred as they exhibit excellent compatibility with the A-B block polymer.

In one embodiment, in the case where one of these other (styrene-) (meth)acrylic-based resins is used as a fixing resin other than the A-B block polymer, this other resin is preferably in the form of a water-soluble resin. This is because, compared with the case where this other (styrene-) (meth)acrylic-based resin that does not have the structure of an A-B block polymer exists in the form of an emulsion or a hydrosol, characteristics such as the water resistance, rub fastness and adhesion of the printed matter can be improved without impairing the decap properties and the discharge stability.

In those cases where a water-soluble resin is used as the other (styrene-) (meth)acrylic-based resin, the weight average molecular weight (Mw) of that water-soluble resin is preferably within a range from at least 10,000 to not more than 50,000, and is more preferably within a range from at least 20,000 to not more than 40,000. A weight average molecular weight of at least 10,000 is preferred in terms of facilitating improvements in the rub fastness and adhesion of the printed mater. On the other hand, when the weight average molecular weight is not more than 50,000, any deterioration in the discharge stability from the inkjet head can be suppressed. The weight average molecular weight of the other (styrene-) (meth)acrylic-based resin can be measured using the method described above.

Furthermore, in those cases where a water-soluble resin is selected as the other (styrene-) (meth)acrylic-based resin, the acid value of the water-soluble resin is preferably adjusted to a value within an appropriate range. In one embodiment, the acid value of the water-soluble resin is preferably within a range from 1 to 100 mgKOH/g, more preferably from 3 to 80 mgKOH/g, and particularly preferably from 5 to 60 mgKOH/g. When the acid value is at least 1 mgKOH/g, redissolution is possible even after the water-based ink has solidified. Accordingly, nozzle blockages of the inkjet head nozzles can be suppressed, and favorable discharge stability can be maintained. On the other hand, provided the acid value is not more than 100 mgKOH/g, any deterioration in the water resistance of the printed matter can be more easily suppressed. The acid value of the other (styrene-) (meth)acrylic-based resin can be calculated or measured using the methods described above.

In one embodiment, in the case where a combination of the A-B block polymer and the other (styrene-) (meth) acrylic-based resin is used, the blend amount of the other (styrene-) (meth)acrylic-based resin relative to the blend amount of the A-B block polymer is preferably within a range from 30 to 300% by weight, and more preferably from 60 to 200% by weight. By ensuring the blend amount of the other (styrene-) (meth)acrylic-based resin falls within this range, the compatibility of the two materials is favorable, and the respective functions of the two materials can manifest favorably. In particular, the blend amount of the other (styrene-) (meth)acrylic-based resin relative to the blend amount of the A-B block polymer is preferably not more than 100% by weight, and is more preferably 80% by weight or less.

On the other hand, in another preferred embodiment, a polyolefin wax emulsion (hereafter also referred to as an "other wax emulsion") is included as a fixing resin other than the A-B block polymer. Although detailed reasons are unclear, when combined with the A-B block polymer, these types of resins can be dispersed stably within the ink, and can be selected favorably in terms of achieving a marked improvement in the rub fastness of the printed matter. Moreover, in those cases where a plastic substrate such as polypropylene, polyethylene, nylon, polystyrene, foamed styrol, polymethyl methacrylate (PMMA) or polycarbonate is used as the printing substrate, printed matter that also exhibits excellent adhesion to the substrate can be obtained.

In those cases where one of these other wax emulsions is used as a fixing resin other than the A-B block polymer, the volume average particle size (D50) of the wax emulsion is preferably from 10 to 200 nm, and more preferably from 20 to 180 nm. Provided the average particle size falls within this range, the above functions are able to manifest favorably. Further, an ink of excellent discharge stability that does not cause blockages of the inkjet head nozzle can be obtained. The volume average particle size can be measured using the method described above.

In one embodiment, in the case where a combination of the A-B block polymer and the other wax emulsion is used, the blend amount of the other wax emulsion relative to the blend amount of the A-B block polymer is preferably within a range from 10 to 100% by weight, and is more preferably from 20 to 80% by weight. By ensuring the blend amount of the other wax emulsion falls within this range, the respective functions of the two materials can manifest favorably.

In one embodiment, a combination of the A-B block polymer, the other (styrene-) (meth)acrylic-based resin, and the other wax emulsion may be used. In such a case, the blend amount of the A-B block polymer relative to the total amount of all the resins is preferably within a range from 20 to 90% by weight, and more preferably from 30 to 80% by weight. By ensuring that the blend amount falls within this range, the functions of the A-B block polymer are able to manifest effectively.

The total amount of the fixing resin in the water-based ink for an inkjet according to an embodiment of the present invention, expressed as a non-volatile fraction relative to the total weight of the water-based ink for an inkjet, is preferably within a range from 1 to 20% by weight, more preferably from 2 to 15% by weight, even more preferably from 3 to 10% by weight, and particularly preferably from 3.5 to 8% by weight.

(Organic Solvent)

The water-based ink for an inkjet according to an embodiment of the present invention contains an organic solvent. Conventionally known compounds may be freely selected and used as the organic solvent. Among these, the selection of an organic solvent for which the SP value determined by Fedors method is from 10.0 to 13.5 (cal/cm$^3$)$^{1/2}$ (hereafter also referred to as a "low SP value solvent") is preferred. As described above, within the ink, it is thought that the A-B block polymer exists in a state where the A block coats the B block. On the other hand, low SP value solvents have high affinity with the A block. As a result, the redissolution properties of ink in a semi-dried state improves, enabling an ink of excellent discharge stability to be obtained.

Moreover, organic solvents having a small SP value generally tend to have a small surface tension. Many of the low SP value solvents mentioned above also have small surface tension values, and therefore exhibit good wet spreadability on the printing substrate, meaning favorable image quality with no voids can be obtained. Further, due to the satisfactory wet spreadability, the surface area of the ink droplets increases following impact on the printing substrate, which can lead to improved drying better through permeation and volatilization, and as a result, mixed color bleeding can be suppressed, and clear printed matter can be obtained.

The SP value determined by Fedors method refers specifically to a value calculated using a formula (2) shown below.

$$(SP\ \text{value}) = (\Sigma E_{coh}/\Sigma V)^{1/2} \quad \text{Formula (2):}$$

In the above formula (2), $E_{coh}$ represents the cohesive energy prescribed for each functional group, and V represents the molar volume prescribed for each functional group. Values for $E_{coh}$ and V are disclosed in R. F. Fedors, "Polymer Engineering & Science" (Vol. 14, No. 2, 1974, pp. 147 to 154).

Further, among low SP value solvents, the selection of an organic solvent having a boiling point at one atmosphere of 150 to 250° C. is particularly preferred, and selection of an organic solvent having a boiling point of 180 to 235° C. is most desirable. By using an organic solvent having such a boiling point, the decap properties and the image quality can be improved. The boiling point at one atmosphere can be measured, for example, using a thermal analysis device.

In one embodiment, examples of low SP value solvents that may be used favorably include monohydric alcohol-based solvents such as methanol (SP value: 11.8, boiling point: 65° C.), ethanol (SP value: 11.4, boiling point: 78° C.), 1-propanol (SP value: 11.8, boiling point: 97° C.), 2-propanol (SP value: 11.0, boiling point: 83° C.), 1-butanol (SP value: 11.3, boiling point: 117° C.), tert-butanol (SP value: 10.9, boiling point: 82° C.), 1-methoxy-2-butanol (SP value: 10.9, boiling point: 135° C.), 2-methoxy-1-butanol (SP value: 10.9, boiling point: 146° C.), 3-methoxy-1-butanol (SP value: 10.9, boiling point: 158° C.), and 3-methoxy-3-methyl-1-butanol (SP value: 10.5, boiling point: 174° C.);

diol-based solvents such as 1,2-propanediol (SP value: 13.5, boiling point: 188° C.), 1,2-butanediol (SP value: 12.7, boiling point: 194° C.), 2-methylpetan-2,4-diol (SP value: 12.7, boiling point: 197° C.), 1,2-pentanediol (SP value: 12.2, boiling point: 210° C.), 2-methyl-1,3-propanediol (SP value: 12.9, boiling point: 214° C.), 1,2-hexanediol (SP value: 11.8, boiling point: 223° C.), 2-ethyl-2-methyl-1,3-propanediol (SP value: 13.3, boiling point: 226° C.), 1,2-heptanediol (SP value: 11.5, boiling point: 227° C.), 2-methyl-2-propyl-1,3-propanediol (SP value: 12.8, boiling point: 230° C.), dipropylene glycol (SP value: 13.3, boiling point: 230° C.), 2-ethyl-1,3-hexanediol (SP value: 12.4, boiling point: 244° C.), 3-methyl-1,5-pentanediol (SP value: 13.4, boiling point: 249° C.), tripropylene glycol (SP value: 12.1, boiling point: 273° C.), and tetraethylene glycol (SP value: 12.8, boiling point: 328° C.);

ethylene glycol monoether-based solvents such as ethylene glycol monomethyl ether (SP value: 12.0, boiling point: 125° C.), ethylene glycol monoisopropyl ether (SP value: 11.0, boiling point: 142° C.), ethylene glycol monoallyl ether (SP value: 11.4, boiling point: 159° C.), ethylene glycol monoisobutyl ether (SP value: 10.7, boiling point: 161° C.), and ethylene glycol monobutyl ether (SP value: 10.8, boiling point: 171° C.); diethylene glycol monomethyl ether (SP value: 11.2, boiling point: 194° C.), diethylene glycol monoethyl ether (SP value: 10.9, boiling point: 196° C.), diethylene glycol monoisopropyl ether (SP value: 10.6, boiling point: 207° C.), diethylene glycol monoisobutyl ether (SP value: 10.4, boiling point: 220° C.), diethylene glycol monobutyl ether (SP value: 10.5, boiling point: 231° C.), diethylene glycol monohexyl ether (SP value: 10.2, boiling point: 259° C.), and diethylene glycol monobenzyl ether (SP value: 11.5, boiling point: 302° C.); and triethylene glycol monomethyl ether (SP value: 10.7, boiling point: 249° C.) and triethylene glycol monobutyl ether (SP value: 10.3, boiling point: 271° C.);

propylene glycol monoether-based solvents such as propylene glycol monomethyl ether (SP value: 10.9, boiling point: 121° C.), propylene glycol monopropyl ether (SP value: 10.5, boiling point: 150° C.), dipropylene glycol monomethyl ether (SP value: 10.4, boiling point: 187° C.), and tripropylene glycol monomethyl ether (SP value: 10.1, boiling point: 242° C.), and pyrrolidone-based solvents such as 2-pyrrolidone (SP value: 12.6, boiling point: 245° C.) and N-methylpyrrolidone (SP value: 10.1, boiling point: 202° C.). The units for the above SP values are (cal/cm$^3$)$^{1/2}$, and the boiling point values represent values at one atmosphere. Further, as mentioned above, solvents having a boiling point at one atmosphere of 150 to 230° C. may be selected particularly favorably.

Further, among the compounds listed above, in terms of achieving superior affinity with the A block which has hydrophilicity, a compound having two or more hydroxyl groups is preferably selected. Among such compounds, selection of a 1,2-alkanediol is particularly desirable. In a 1,2-alkanediol, the hydroxyl groups that represent the hydrophilic units and the alkyl group that represents the hydrophobic unit are localized, and therefore it is thought that favorable affinity with water can be achieved, ensuring improvements in the storage stability and discharge stability of the ink, while the surface tension of the ink can also be lowered into the favorable range, meaning the wet spreadability of the ink can be improved, and printed matter having excellent image quality with no voids can be produced.

In one embodiment, the blend amount of the low SP value solvent described above relative to the total weight of the water-based ink for an inkjet is preferably from 5 to 50% by weight, more preferably from 10 to 45% by weight, and even more preferably from 15 to 40% by weight. By ensuring the blend amount falls within this range, voids and mixed color bleeding can be favorably suppressed, and printed matter of excellent image quality can be obtained regardless of the printing substrate.

Furthermore, from the viewpoint of improving the decap properties and the discharge stability, as well as the water resistance and rub fastness of the printed matter, the blend amount of the A-B block polymer is preferably also taken into consideration when determining the blend amount of the low SP value solvent. In one embodiment, the blend amount of the low SP value solvent is preferably within a range from 2 to 35 times the blend amount of the A-B block polymer, and is more preferably from 2.5 to 17.5 times, and particularly preferably 3 to 12 times, the blend amount of the A-B block polymer.

In the water-based ink for an inkjet of an embodiment of the present invention, in addition to the organic solvent described above, another organic solvent may also be used for purposes such as adjusting the ink viscosity, improving the discharge stability, and imparting better adhesion to the printed matter. Examples of solvents that may be used include 3-methyl-1,3-butanediol, 2,2-dimethyl-1,3-propanediol, 1,3-propanediol, 1,3-butanediol, 1,4-butanediol, 1,5-pentanediol, 1,6-hexanediol, glycerol, ethylene glycol, diethylene glycol, triethylene glycol, N-ethylpyrrolidone, gamma-butyrolactone, 3-methyl-2-oxazolidinone, 3-methoxy-N,N-dimethylpropionamide, and 3-butoxy-N,N-dimethylpropionamide.

In one embodiment, the water-based ink for an inkjet preferably contains a glycol ether and/or a 1,2-alkanediol of three or more carbon atoms. These solvents exhibit excellent permeability into various printing substrates, and even permeate into the low-absorption substrates described below, thereby preventing mixed color bleeding. Among these glycol ethers and/or a 1,2-alkanediols of three or more carbon atoms, in the water-based ink for an inkjet according to an embodiment of the present invention, selection of a compound for which the SP value determined by Fedors method is from 10.0 to 13.5 $(cal/cm^3)^{1/2}$ is preferred, and among such compounds, selection of a 1,2-alkanediol of three or more carbon atoms is particularly desirable. The number of carbon atoms is preferably not more than 12, and is more preferably 6 or fewer.

Furthermore, in one embodiment, it is preferable that the water-based ink for an inkjet contains only a glycol ether and/or a 1,2-alkanediol of three or more carbon atoms for which the SP value determined by Fedors method is from 10.0 to 13.5 $(cal/cm^3)^{1/2}$ as the organic solvent, and this ink is able to produce printed matter having excellent image quality with no voids or mixed color bleeding.

The total amount of the organic solvent contained in the water-based ink for an inkjet of an embodiment of the present invention is preferably within a range from 5 to 55% by weight, more preferably from 8 to 50% by weight, and particularly preferably from 10 to 45% by weight, relative to the total weight of the water-based ink.

On the other hand, regardless of the printing substrate, from the viewpoint of obtaining printed matter having favorable rub fastness and excellent image quality with mixed color bleeding, in the water-based ink for an inkjet of an embodiment of the present invention, the amount of the organic solvent having a boiling point at one atmosphere of 270 to 400° C., relative to the total weight of the ink, is preferably from 0 to 5% by weight, more preferably from 0 to 3% by weight, and even more preferably from 0 to 1% by weight. In this description, "0% by weight" represents the case where the subject organic solvent is not included. Furthermore, this "organic solvent having a boiling point at one atmosphere of 270 to 400° C." also includes those low SP value solvents described above that have a boiling point at one atmosphere of 270 to 400° C.

Further, from the viewpoint of dramatically improving the decap properties, the amount of the organic solvent having a boiling point at one atmosphere of 100 to 150° C., relative to the total weight of the ink, is preferably from 0 to 5% by weight, more preferably from 0 to 3% by weight, and even more preferably from 0 to 1% by weight. This "organic solvent having a boiling point at one atmosphere of 100 to 150° C." also includes those low SP value solvents described above that have a boiling point at one atmosphere of 100 to 150° C. However, water is not included in this "organic solvent having a boiling point at one atmosphere of 100 to 150° C.".

(Pigment)

Pigments that may be used in the water-based ink for an inkjet according to an embodiment of the present invention are described below. Any one type of the pigments described below may be used alone, or a combination of two or more types of pigment may be used.

Examples of inorganic pigments that may be used favorably as the pigment include titanium oxide, zinc oxide, zinc sulfide, white lead, calcium carbonate, precipitated barium sulfate, white carbon, alumina white, kaolin clay, talc, bentonite, black iron oxide, cadmium red, red iron oxide, molybdenum red, molybdate orange, chrome vermilion, chrome yellow, cadmium yellow, yellow iron oxide, titanium yellow, chromium oxide, viridian, titanium cobalt green, cobalt green, cobalt chrome green, Victoria green, ultramarine blue, Prussian blue, cobalt blue, cerulean blue, cobalt silica blue, cobalt zinc silica blue, manganese violet and cobalt violet.

Further, examples of organic pigments include azo pigments, phthalocyanine pigments, anthraquinone pigments, quinacridone pigments, isoindolinone pigments, quinophthalone pigments, dye lake pigments and fluorescent pigments.

More specifically, listed in terms of their color index values, examples of cyan pigments include C. I. Pigment Blue 1, 2, 3, 15:1, 15:3, 15:4, 15:6, 16, 21, 22, 60 and 64.

Examples of magenta pigments include C. I. Pigment Red 5, 7, 9, 12, 31, 48, 49, 52, 53, 57, 97, 112, 120, 122, 146, 147, 149, 150, 168, 170, 177, 178, 179, 184, 185, 188, 202, 206, 207, 209, 238, 242, 254, 255, 264, 269 and 282; and C. I. Pigment Violet 19, 23, 29, 30, 32, 36, 37, 38, 40 and 50.

Examples of yellow pigments include C. I. Pigment Yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185 and 213.

Further, examples of black pigments include carbon blacks produced by the furnace method or the channel method. Among these, carbon blacks having properties including a primary particle size of 11 to 40 nm, a specific surface area measured by the BET method of 50 to 400 m²/g, a volatile fraction of 0.5 to 10%, and a pH value of 2 to 10 are preferred. Examples of commercially available products having these types of properties include No. 33, 40, 45, 52, 900, 2200B, 2300, MA7, MA8 and MCF88 (all manufactured by Mitsubishi Chemical Corporation); RAVEN 1255 (manufactured by Columbian Chemicals Co., Inc.), REGA 330R, 400R and 660R, MOGUL L, and ELFTEX 415 (all manufactured by Cabot Corporation); and Nipex 90, Nipex 150T, Nipex 160IQ, Nipex 170IQ, Nipex 75, Printex 85, Printex 95, Printex 90, Printex 35 and Printex U (all manufactured by Evonik Japan Co., Ltd.), and any of these products can be used favorably.

Besides carbon blacks, examples of other black pigments that may be used in the present embodiment include aniline black, Lumogen black, and azomethine azo black and the like. Further, a plurality of color pigments such as the cyan pigments, magenta pigments and yellow pigments described above, and special color pigments such as the brown pigments and orange pigments described below, may also be used to form a black pigment.

Examples of pigments other than cyan, magenta, yellow and black pigments include C. I. Pigment Green 7, 10 and 36; C. I. Pigment Brown 3, 5, 25 and 26; and C. I. Pigment Orange 2, 5, 7, 13, 14, 15, 16, 24, 34, 36, 38, 40, 43, 62, 63, 64 and 71.

The amount of the pigment, based on the total weight of the ink, is preferably at least 0.5% by weight but not more than 15% by weight, more preferably at least 1% by weight but not more than 12% by weight, even more preferably at least 1.5% by weight but not more than 10% by weight, and particularly preferably at least 2% by weight but not more than 8% by weight. By ensuring an amount of at least 0.5% by weight, printed matter having excellent image density and clarity can be produced. Further, inks in which the pigment content is not more than 15% by weight do not suffer from aggregation of excess pigment, even if the ink reaches a semi-dried state on the nozzle surfaces of the inkjet head. Accordingly, by combining the pigment with the A-B block polymer, an ink of excellent discharge stability can be obtained.

(Pigment Dispersing Resin)

In order to maintain favorable ink stability over a long period of time, the above pigment is used in a dispersed state within the ink. Examples of the method used for dispersing the pigment include methods of dispersing the pigment without a dispersant by modifying the surface of the pigment using an oxidation treatment or a resin coating or the like, and methods that use a surfactant or a resin as a dispersant. In order to obtain a more stable ink, the pigment is preferably dispersed using a dispersant, and the use of a resin as the dispersant (hereafter referred to as a "pigment dispersing resin") is particularly preferred. This is because by adjusting the monomer composition and the molecular weight of the pigment dispersing resin, the pigment adsorption properties, the electrostatic repulsion properties and the steric repulsion properties can be controlled easily, and as a result, the dispersion stability and discharge stability of fine pigments, as well as the gloss and clarity of the printed matter, can be improved.

When dispersion is performed using a pigment dispersing resin, examples of resins that may be used include styrene-based polymers, (meth)acrylic-based polymers, styrene-(meth)acrylic-based polymers, maleic acid-based polymers, styrene-maleic acid-based polymers, α-olefin-maleic acid-based polymers, urethane-based polymers, and ester-based polymers. Among these, the use of a (meth)acrylic-based polymer and/or a styrene-(meth)acrylic-based polymer is preferred. Further, there are no particular limitations on the structure of these resins, and resins having random structures, block structures, comb-like structures and star-like structures may all be used as desired.

In one embodiment, the water-based ink for an inkjet contains at least one type of polymer selected from among styrene-based block polymers, (meth)acrylic-based block polymers and a styrene-(meth)acrylic-based block polymers as a pigment dispersing resin. In such a case, the pigment dispersing resin and the A-B block polymer contained in the fixing resin described above are differentiated on the basis of whether or not the polymer can readily adsorb to the pigment to stabilize the dispersion state of the pigment in the ink. Specifically, the polymers can be differentiated experimentally using the method described below that applies the method disclosed in JIS K 5101-1-4:2004.

Twenty parts of a carbon black having a primary particle size of 15 to 25 nm, a nitrogen adsorption specific surface area of 120 to 260 $m^2/g$, and a DBP absorption (granular) of 40 to 80 $cm^3/100$ g, 10 parts of the resin and 70 parts of water are mixed thoroughly (premixing), and subsequently, a beads mill (for example, a Dyno-Mill manufactured by Shinmaru Enterprises Corporation) with a capacity of 0.6 L filled with 1,800 parts of zirconia grinding beads of diameter 0.5 mm is used to perform a dispersion for two hours. Following dispersion, the viscosity of the thus obtained carbon black dispersion at 25° C. is measured using an E-type viscometer (for example, an ELD viscometer manufactured by Toki Sangyo Co., Ltd.), and subsequently, the carbon black dispersion is then stored for one week in a thermostatic chamber at 70° C. and the viscosity is remeasured. At this time, if the viscosity of the dispersion immediately following dispersion is 100 mPa·s or less and the absolute value of the change in viscosity of the carbon black dispersion during the storage period is 10% or less, then the resin is deemed to be a pigment dispersing resin.

In one preferred embodiment, the pigment dispersing resin has an alkyl group of 8 or more carbon atoms. Further, the pigment dispersing resin more preferably has an alkyl chain of 10 to 36 carbon atoms, even more preferably has an alkyl chain of 12 to 30 carbon atoms, and most preferably has an alkyl chain of 18 to 24 carbon atoms. When the pigment dispersing resin has an alkyl group of 8 or more carbon atoms, the dispersion stability of the ink can be more easily enhanced. Further, as the dispersion stability improves, improvements in the image quality and the gloss can also be enhanced. Examples of the method used for synthesizing the pigment dispersing resin having an alkyl group include methods in which an alcohol and/or amine having an alkyl group is condensed with a functional group such as a carboxylic acid in the base resin skeleton, and methods in which a monomer having an alkyl group is used during the resin synthesis to synthesize a resin having alkyl groups.

The alkyl group of 8 or more carbon atoms mentioned above may be linear or branched. Specific examples of the alkyl group include an octyl group (C8), 2-ethylhexyl group (C8), nonyl group (C9), decyl group (C10), lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanoyl group (C32), tetratriacontanoyl group (C34), and hexatriacontanoyl group (C36). Among these, a linear alkyl group is preferred.

Further, in one embodiment, the pigment dispersing resin described above preferably has an aromatic group. By introducing an aromatic group, the pigment dispersibility can be enhanced, and the dispersion stability and the gloss of the printed matter can be improved. Examples of the aromatic group include a phenyl group, a naphthyl group, an anthryl group, a tolyl group, a xylyl group, a mesityl group and an anisyl group. Among these, the aromatic group is preferably a phenyl group or a tolyl group. Examples of monomers that may be used during synthesis of the pigment dispersing resin in order to introduce the aromatic group include styrene, methylstyrene and vinylnaphthalene.

Although not a particular limitation, in one preferred embodiment, the pigment dispersing resin is a copolymer obtained by polymerizing (i) (meth)acrylic acid, (ii) a (meth) acrylate ester having an alkyl group of 8 or more carbon atoms, and if necessary (iii) a polymerizable compound having an aromatic group. In one embodiment, the blend amount of (i), based on the total weight of all the monomer components that form the copolymer, is preferably within a range from 10 to 50% by weight, and more preferably from 20 to 40% by weight. Further, in one embodiment, the blend amount of (ii), based on the total weight of all the monomer components that form the copolymer, is preferably within a range from 10 to 70% by weight, and more preferably from 20 to 50% by weight. Moreover, in one embodiment, the blend amount of (iii), based on the total weight of all the monomer components that form the copolymer, is preferably within a range from 0 to 50% by weight, and more preferably from 10 to 40% by weight.

The weight average molecular weight of the pigment dispersing resin is preferably from 5,000 to 100,000. By adjusting the molecular weight to a value of at least 5,000, the pigment can be stably dispersed in water, and an ink having excellent dispersion stability can be obtained. Further, by ensuring that the molecular weight is not more than 100,000, an ink having excellent discharge stability can be obtained. The molecular weight is more preferably within a range from 10,000 to 50,000, and even more preferably from 15,000 to 30,000.

The acid value of the above pigment dispersing resin is preferably from 100 to 400 mgKOH/g. Provided the acid value is at least 100 mgKOH/g, the pigment dispersing resin can be more easily dissolved in water, and the viscosity of the dispersion can be kept low. Further, provided the acid value is not more than 400 mgKOH/g, interactions between the pigment dispersing resin molecules are favorable, thereby keeping the viscosity of the ink low. From these viewpoints, the acid value of the pigment dispersing resin is more preferably from 100 to 350 mgKOH/g, and even more preferably from 150 to 300 mgKOH/g.

In order to improve the solubility in water, the pigment dispersing resin used in the present embodiment is preferably a resin in which the acid group within the pigment dispersing resin has been neutralized with a base. Examples of bases that may be used include organic bases such as dimethylaminoethanol, diethanolamine and triethanolamine; ammonia water; and inorganic bases such as lithium hydroxide, sodium hydroxide and potassium hydroxide. Among these, using an organic base means the base tends to volatilize during drying of the ink, thereby improving the water resistance of the printed matter, and is consequently preferred.

The amount of the pigment dispersing resin is preferably from 1 to 50% by weight relative to the weight of the pigment. By ensuring that the proportion of the pigment dispersing resin falls within this range, the viscosities of the pigment dispersion and the ink can be kept low, and the dispersibility and storage stability can be improved. The amount of the pigment dispersing resin relative to the pigment is more preferably from 2 to 45% by weight, even more preferably from 3 to 40% by weight, and most preferably from 4 to 35% by weight.

(Surfactant)

In one embodiment, a surfactant may also be included in the ink. By using a surfactant, superior wet spreadability can be achieved, and printed matter of excellent image quality with no voids can be obtained.

Examples of known surfactants include siloxane-based surfactants, acetylene-based surfactants, fluorine-based surfactants, and glycol ether-based surfactants, and any of these surfactants may be used favorably. Among these, at least one type of material selected from among siloxane-based surfactants and acetylene-based surfactants is preferably used, and the use of at least one siloxane-based surfactant and at least one acetylene-based surfactant is particularly preferred. The siloxane-based surfactant is preferably a polysiloxane-based surfactant. In this description, a "polysiloxane-based surfactant" means a siloxane-based surfactant having at least three siloxane units.

For the siloxane-based surfactant, using a compound represented by general formula (3) and/or general formula (5) is preferred, and selecting a compound represented by general formula (5) is particularly desirable. Further, in one embodiment, use of a combination of a compound represented by general formula (3) and a compound represented by general formula (5) is also desirable. The amount of surfactant in the ink is preferably at least 0.1% by weight but not more than 5% by weight, more preferably at least 0.5% by weight but not more than 3% by weight, even more preferably at least 0.8% by weight but not more than 2% by weight, and most preferably at least 1% by weight but not more than 1.5% by weight.

[Chemical formula 1]

General formula (3)

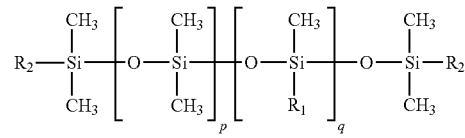

In general formula (3), p represents an integer of 0 or greater, and q represents an integer of 1 or greater. Further, $R_1$ represents a group represented by general formula (4) shown below, and $R_2$ represents an alkyl group of 1 to 6 carbon atoms.

[Chemical formula 2]

General formula (4)

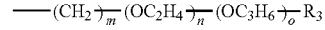

In general formula (4), m represents an integer of 1 to 6, n represents an integer of 0 to 50, and o represents an integer of 0 to 50, provided that n+o is an integer of 1 or greater. $R_3$ represents a hydrogen atom, an alkyl group of 1 to 6 carbon atoms, or a (meth)acrylic group.

[Chemical formula 3]

General formula (5)

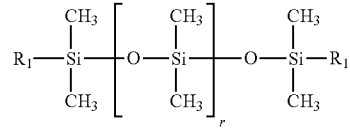

In general formula (5), r represents an integer of 1 to 80. Further, $R_1$ represents a group represented by general formula (4) shown above.

Compounds represented by the above general formula (3) are effective in improving the discharge stability and suppressing printed matter voids. Examples of commercially available products include SF8428, FZ-2162, 8032 Additive, SH3749, FZ-77, L-7001, L-7002, FZ-2104, FZ-2110, F-2123, SH8400 and SH3773M manufactured by Dow Corning Toray Co., Ltd.; BYK-345, BYK-346, BYK-347, BYK-348 and BYK-349 manufactured by BYK Chemie GmbH; TEGO Wet 250, TEGO Wet 260, TEGO Wet 270 and TEGO Wet 280 manufactured by Evonik Japan Co., Ltd.; KF-351A, KF-352A, KF-353, KF-354L, KF-355A, KF-615A, KF-640, KF-642 and KF-643 manufactured by Shin-Etsu Chemical Co., Ltd.; and the SILFACE SAG series manufactured by Nissin Chemical Industry Co., Ltd.

Further, compounds represented by the above general formula (5) are effective in suppressing mixed color bleeding in the printed matter. Examples of commercially available products include BY16-201 and SF8427 manufactured by Dow Corning Toray Co., Ltd.; BYK-331, BYK-333 and BYK-UV3500 manufactured by BYK Chemie GmbH; and TEGO Glide 410, TEGO Glide 432, TEGO Glide 435, TEGO Glide 440 and TEGO Glide 450 manufactured by Evonik Japan Co., Ltd.

On the other hand, for the acetylene-based surfactant, a compound represented by general formula (6) is preferably used. Examples of commercially available products represented by general formula (6) include Surfynol 104, Surfynol 420, Surfynol 440, Surfynol 465, Surfynol DF110D, Dynol 604 and Dynol 607, manufactured by Air Products and Chemicals, Inc. Further, compounds synthesized using the method disclosed in JP 2002-356451 A may also be used.

[Chemical formula 4]

General formula (6)

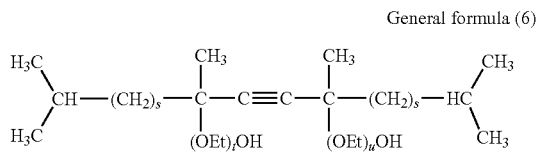

In general formula (6), s represents an integer of 0 to 3, and t+u represents an integer of 0 to 20. Further, Et represents an ethylene group.

(Water)

In one embodiment, the water included in the ink is preferably not a typical water containing various ions, and the use of an ion-exchanged water (deionized water) is preferred. The amount of water relative to the total weight of the ink is preferably within a range from at least 20% by weight to not more than 90% by weight, more preferably within a range from at least 35% by weight to not more than 85% by weight, and even more preferably within a range from at least 50% by weight to not more than 80% by weight.

(Other Components)

In one embodiment, in addition to the components described above, a pH adjuster may be added as required to the water-based ink for an inkjet. Any material having a pH adjustment function may be selected as desired. In those cases where the ink needs to be made more basic, examples of materials that may be used include alkanolamines such as monoethanolamine, diethanolamine, triethanolamine, dimethylaminoethanol, and 2-amino-2-methylpropanol; ammonia; alkali metal hydroxides such as lithium hydroxide, sodium hydroxide and potassium hydroxide; and alkali metal carbonates such as lithium carbonate, sodium carbonate, sodium hydrogen carbonate and potassium carbonate. Further, in those cases where the ink needs to be made more acidic, examples of materials that may be used include hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid. One of the above pH adjusters may be used alone, or a combination of two or more pH adjusters may be used.

The blend amount of the pH adjuster, relative to the total weight of the water-based ink for an inkjet, is preferably from 0.01 to 5% by weight, more preferably from 0.1 to 3% by weight, and most preferably from 0.2 to 1.5% by weight. By adjusting the blend amount to a value within the above range, pH variation caused by the dissolution of atmospheric carbon dioxide or the like can be prevented. Furthermore, in the case of an embodiment in which the A-B block polymer is neutralized using a cationic substance, the ink pH can be adjusted without impairing the action of the cationic substance.

In one embodiment, in order to obtain an ink having certain desired physical property values, appropriate amounts of additives such as thickeners, preservatives, infrared absorbers and ultraviolet absorbers may be added to the water-based ink for an inkjet in addition to the various components described above. In one preferred embodiment, the blend amount of these additives is preferably at least 0.01% by weight but not more than 10% by weight relative to the total weight of the ink, and is more preferably at least 0.05% by weight but not more than 5% by weight, and even more preferably at least 0.1% by weight but not more than 3% by weight.

(Method for Preparing Ink)

Examples of methods for preparing an ink of an embodiment of the present invention containing the types of components described above are described below, but the method for preparing an ink of an embodiment of the present invention is not limited to these particular methods.

(I. Preparation of Pigment Dispersion)

The pigment, water and, if required, a pigment dispersant (for example, a pigment dispersing resin) are mixed and stirred (premixing step), and a dispersion treatment is then performed using a dispersion device described below as required (dispersion step). Further, if required, a filtration treatment using a filter or the like and/or a centrifugal separation treatment may be performed, yielding a pigment dispersion. In one embodiment, at least a portion of the fixing resin may be added during the above premixing step and/or the dispersion step.

The dispersion device used in the above dispersion treatment may be any typically used dispersion device, and examples include a ball mill, roll mill, sand mill, beads mill, paint shaker and microfluidizer. Among these, a beads mill can be used particularly favorably.

Because the ink of an embodiment of the present invention is for inkjet use, from the viewpoint of preventing blockages of the inkjet head nozzles, the particle size distribution of the pigment is preferably optimized. Examples of methods that may be used for obtaining a pigment having the desired particle size distribution include methods in which an aforementioned filtration treatment and/or centrifugal separation treatment is introduced, as well as methods in which the diameter of the grinding media in the dispersion device is reduced, methods in which the fill ratio of the grinding media is increased, methods in which the dispersion treatment time is lengthened, or combinations of a plurality of these methods. The particle size distribution of the ink can be measured, for example, in the same manner as described above for the volume average particle size (D50) of an A-B block polymer that adopts an emulsion or hydrosol form.

(II. Preparation of Ink)

Next, the fixing resin, the organic solvent, water, and any of the above additive components that are required are added to the above pigment dispersion and stirred thoroughly. By subsequently performing a filtration treatment as required, an ink of an embodiment of the present invention can be obtained.

During the above stirring, in order to achieve a more uniform mixture, the mixture may be heated. In such a case, the liquid temperature of the mixture is preferably no higher than the glass transition temperature of the A-B block polymer.

Further, examples of the method used for the above filtration treatment include pressurized filtration, reduced-pressure filtration, and centrifugal filtration and the like, and a plurality of these methods may also be combined. In those cases where a filter is used in a pressurized filtration or reduced-pressure filtration, the pore size of the filter is preferably from 0.3 to 2.5 µm.

(Ink Viscosity)

The ink of an embodiment of the present invention preferably has a viscosity at 25° C. of 1 to 20 mPa·s. Provided the viscosity is within this range, favorable discharge properties from the inkjet head can be more easily maintained. The viscosity is more preferably from 2 to 15 mPa·s, and even more preferably from 3 to 12 mPa·s. The viscosity can be measured using an E-type viscometer (TVE-20L, manufactured by Toki Sangyo Co., Ltd.), under conditions including a temperature of 25° C. and a rotational rate of 50 rpm.

<Ink Set>

The ink of an embodiment of the present invention may be used for a single color, or depending on the application, may be used in an ink set that combines a plurality of colors. Although there are no particular limitations on the color combination used, in one embodiment, by using the three colors of cyan, magenta and yellow, full color images can be obtained. Further, by also adding a black ink to the ink set, the level of blackness can be improved, and the legibility of text and the like can be improved. Moreover, by also adding special colors such as orange and green to the ink set, the color reproducibility can be improved. Moreover, when printing is performed to a non-white printing substrate, including a white ink enables more distinct images to be more easily obtained.

In those cases where an ink set of the present embodiment is used in the form of an ink set containing a combination of cyan, magenta and yellow, examples of preferred pigments are as follows. Examples of the cyan pigment include C. I. Pigment Blue 15:3 and 15:4. Examples of the magenta pigment include C. I. Pigment Red 122, 150, 202, 209, 269 and 282, and C. I. Pigment Violet 19. Examples of the yellow pigment include C. I. Pigment Yellow 12, 13, 14, 74, 120, 150, 155 and 185. By using a combination of pigments selected from among those listed above, superior color reproducibility can be more easily obtained.

<Method for Producing Printed Matter, and Printed Matter>

(Printing Method)

Generally, the method used for printing the water-based ink for an inkjet is a method in which the ink is discharged from the nozzles of an inkjet head, and the ink droplets are adhered to a printing substrate. The inkjet printers housing the inkjet head and used for the printing process can be broadly classified into two main types based on the printing system employed. One type is the "shuttle scan type" in which the head is moved back and forth over the printing substrate while discharging the ink, and the other type is a "line pass type" in which the position of the head that discharges the ink is fixed, and the printing substrate is passed beneath the head while the ink is discharged.

Compared with the shuttle scan type, line pass type printers are more capable of high-speed printing, and can be expected to act as effective replacements for existing high-speed printers such as offset printing devices. However, the flushing that is performed in shuttle scan type printers cannot be performed, and depending on the pattern being printed, nozzles from which ink is not discharged for a long time can occur, meaning discharge faults are more likely to occur than shuttle scan type systems. In this manner, particularly in the case of line pass type printers, resolving this tradeoff between increased printing speed and suppression of discharge faults is an important issue.

On the other hand, as described above, the water-based ink for an inkjet according to an embodiment of the present invention has excellent decap properties and discharge stability, and also yields excellent image quality for the printed matter. Accordingly, the water-based ink for an inkjet of an embodiment of the present invention can be used particularly favorably even in line pass type inkjet printing methods.

(Printing Substrate)

There are no particular limitations on the types of printing substrate on which the water-based ink for an inkjet according to an embodiment of the present invention can be used, and conventional printing substrates typical of this technical field may be used. Examples include paper substrates such as high-quality papers, coated papers, art papers, cast papers, synthetic papers, and special inkjet papers; plastic substrates such as polyvinyl chloride, polyethylene terephthalate (PET), polypropylene (PP), polyethylene (PE), nylon, polystyrene, foamed styrol, polymethyl methacrylate (PMMA) and polycarbonate; glass substrates; and fabric substrates and the like. The surfaces of these printing substrates may be smooth, or may have an uneven shape. Further, the printing substrate may be transparent, semi-transparent or opaque. Moreover, there are no particular limitations on the shape of the printing substrate, and examples include film-like, sheet-like and plate-like substrates. A substrate in which two or more types of printing substrates have been bonded together may also be used as the printing substrate. Moreover, a functional layer such as an adhesive layer, the surface of which has been protected with a release sheet or the like, may be provided on the opposite side from the printing surface, or a functional layer such as an adhesive layer may be provided on the printed surface following printing.

The water-based ink for an inkjet of an embodiment of the present invention is also suitable for printing to low-absorption substrates typified by coated paper substrates such as coated papers, art papers and cast papers; and plastic substrates such as polyvinyl chloride sheets, PET films, PP films, PE films and nylon films. The expression "low-absorption substrate" means a printing substrate that either absorbs no water or has a slow absorption rate. When a conventional water-based ink is used to perform printing to this type of substrate having low water absorption, image bleeding often occurs. However, in the case of a water-based ink for an inkjet containing the fixing resin described above, the mixed color bleeding suppression effect due to the orientation at the ink droplet interface means that printed matter of excellent image quality can be obtained. In other words, a water-based ink for an inkjet is obtained that exhibits excellent image quality on all manner of printing substrates.

Whether or not a substrate is a low-absorption substrate can be determined on the basis of the water absorption coefficient measured by Bristow's method (J. TAPPI paper pulp test method No. 51-87). Specifically, using an Auto Scan absorption meter manufactured by Kumagai Riki Kogyo Co., Ltd. and water, a relationship plot is generated between the amount of water absorption (ml/m$^2$) obtained in a contact time of 100 to 1,000 milliseconds and the square root of the contact time (msec$^{1/2}$), the gradient of the straight line is calculated by the least squares method, and this gradient is deemed to represent the absorption coefficient. In one embodiment, substrates for which this absorption coefficient is within a range from 0 to 0.6 ml/m$^2$·msec$^{1/2}$ are adjudged to be low-absorption substrates.

In one embodiment, the water-based ink for an inkjet is preferably used on a printing substrate having a 60° gloss value of 40 or higher. By using a printing substrate for which the 60° gloss value is 40 or higher, high-quality printed matter having a glossy appearance can be obtained. Examples of printing substrates having a 60° gloss value of 40 or higher include coated paper substrates such as coated papers, art papers and cast papers, and plastic substrates such as polyvinyl chloride sheets, PET films and PP films. In this description, the "60° gloss value" is a value obtained using the measurement method prescribed in JIS Z 8741.

(Coating Treatment)

In one embodiment, the printed matter obtained by printing the water-based ink for an inkjet to a plastic substrate may, if required, be subjected to a coating treatment of the printed surface. Specific examples of the coating treatment include the coating or printing of a coating composition; and lamination methods such as dry lamination methods, solventless lamination methods, extrusion lamination methods and hot melt lamination. Any one of these methods may be selected, or a combination of both types of coating treatment may be used.

(Pretreatment Liquid)

Further, in one embodiment, a method in which the water-based ink for an inkjet is printed onto a printing substrate on which an ink aggregation layer has been formed using a pretreatment liquid. This "ink aggregation layer" is a layer that actively causes aggregation of the solid components such as the pigment and the fixing resin within the ink, and enables bleeding between ink droplets to be prevented, thereby dramatically improving the image quality regardless of the printing substrate.

In order to form an ink aggregation layer, the pretreatment liquid contains a coagulant component. Conventionally known materials may be used as the coagulant component. Among these, in the case of a pretreatment liquid for use with the water-based ink for an inkjet of an embodiment of the present invention, from the viewpoint of achieving superior speed and function for the interaction with the structural unit (P-1) having an anionic functional group, contained within the A-B block polymer in the ink, the coagulant component preferably contains a salt of a polyvalent metal ion.

The salt of a polyvalent metal ion may be an inorganic metal salt, and organic metal salt, or a combination thereof, and there are no particular limitations provided the salt is a metal salt containing a polyvalent metal ion and an anion that is bonded to that polyvalent metal ion. Further, a single type of polyvalent metal ion salt may be used alone, or a combination of two or more types may be used. Among the various possibilities, in terms of facilitating the interaction with the solid components such as the pigment and the fixing resin, including at least one type of ion selected from among $Ca^{2+}$, $Mg^{2+}$, $Zn^{2+}$, $Al^{3+}$, $Fe^{2+}$ and $Fe^{3+}$ as the polyvalent metal ion is preferred. Moreover, among such ions, polyvalent metal ions selected from among $Ca^{2+}$, $Mg^{2+}$, $Zn^{2+}$ and $Al^{3+}$ can be used more favorably, as they exhibit high ionization tendencies and are readily ionized inside the ink aggregation layer, which offers the advantage of a larger aggregation effect. In particular, polyvalent metal ions selected from among $Ca^{2+}$ and $Mg^{2+}$ have small ionic radii and can move readily inside the ink aggregation layer, and are consequently particularly preferred.

Specific examples of inorganic metal salts include, but are not limited to, calcium chloride, magnesium chloride, aluminum chloride, calcium bromide, magnesium bromide, calcium nitrate, magnesium nitrate, magnesium sulfate, aluminum sulfate, calcium carbonate and magnesium carbonate. Among these inorganic metal salts, in terms of the solubility in water, and ensuring that the interactions with the solid components in the ink occur efficiently and rapidly, a chloride or a nitrate is particularly desirable.

Further, examples of organic metal salts include, but are not limited to, the calcium salts, magnesium salts, nickel salts, and zinc salts and the like of organic acids such as pantothenic acid, propionic acid, ascorbic acid, acetic acid and lactic acid. Among these organic acid metal salts, in terms of the solubility in water and the interactions with the solid components in the ink, the calcium salts of lactic acid and/or acetic acid are preferably selected.

The amount of the salt of a polyvalent metal ion, expressed as an amount of the polyvalent metal ion relative to the total weight of the pretreatment liquid, is preferably within a range from 1 to 20% by weight, more preferably from 1.5 to 16% by weight, even more preferably from 2 to 12% by weight, and particularly preferably from 2.5 to 8% by weight. As mentioned above, by ensuring that the amount of metal ions falls within the above range, mixed color bleeding can be suppressed, while more easily ensuring satisfactory wet spreadability of the printing substrate by the pretreatment liquid. The amount of the polyvalent metal ion relative to the total weight of the pretreatment liquid can be determined from formula (7) shown below.

$$\text{(Amount of polyvalent metal ion)(\% by weight)} = WC \times MM/MC \qquad \text{Formula (7):}$$

In the above formula (7), WC represents the amount of the salt of the polyvalent metal ion relative to the total weight of the pretreatment liquid, MM represents the ion content of the polyvalent metal ion that forms the salt of the polyvalent metal ion, and MC represents the molecular weight of the salt of the polyvalent metal ion. The ion content means the atomic weight or molecular weight.

(Printed Matter)

Printed matter is produced using the method for producing printed matter described above. The printed matter typically has at least the printing substrate, and an image such as text or a pattern printed on the printing substrate using the water-based ink for an inkjet. The surface of the printed matter may be subjected to a coating treatment.

EXAMPLES

The present invention is described below in further detail using a series of examples and comparative examples. In the following description, unless particularly stated otherwise, "parts", "%" and "ratios" all represent weight-referenced values.

Production Example for Cyan Pigment Dispersion 1

A mixing vessel was charged with 20 parts of LIONOGEN BLUE FG-7358G (C. I. Pigment Blue 15:3, manufactured by Toyo Color Co., Ltd.) as a pigment, 15 parts of a water-based solution (non-volatile fraction: 20%) of a water-soluble styrene-acrylic resin (a random copolymer in which styrene:acrylic acid:behenyl methacrylate=35:30:35 (weight ratio), weight average molecular weight: 16,000, acid value: 250 mgKOH/g) as a pigment dispersing resin and 65 parts of water, and a preliminary dispersion treatment was conducted by mixing the components thoroughly using a Disper (stirring device). The water-based solution of the water-soluble styrene-acrylic resin was prepared using the method disclosed in Production Example 2 of the specification of JP 2012-188581 A.

Subsequently, the mixture that had undergone the preliminary dispersion treatment was subjected to a main dispersion treatment using a Dyno-Mill with a capacity of 0.6 L filled with 1,800 g of zirconia beads of diameter 0.5 mm (fill ratio: 80%). Following this main dispersion treatment, the pigment concentration was adjusted to 10% by adding an amount of water equal to the weight of the mixture, thus forming a cyan pigment dispersion 1.

In this description, the expression "water-based solution" refers to a solution containing an aqueous medium (a medium containing water), and a component dispersed and/or dissolved in that aqueous medium.

(Production Example for Magenta Pigment Dispersion 1)

With the exception of altering the pigment to FASTOGEN Super Magenta RTS (C. I. Pigment Red 122, manufactured by DIC Corporation), the same method as the cyan pigment dispersion 1 was used to obtain a magenta pigment dispersion 1 (pigment concentration: 10%).

(Production Example for Yellow Pigment Dispersion 1)

With the exception of altering the pigment to LIONOL YELLOW TT-1405G (C. I. Pigment Yellow 14, manufactured by Toyo Color Co., Ltd.), the same method as the cyan pigment dispersion 1 was used to obtain a yellow pigment dispersion 1 (pigment concentration: 10%).

(Production Example for Black Pigment Dispersion 1)

With the exception of altering the pigment to PrinteX 85 (carbon black, manufactured by Orion Engineered Carbons S.A.), the same method as the cyan pigment dispersion 1 was used to obtain a black pigment dispersion 1 (pigment concentration: 10%).

In addition, in the examples below, a self-dispersing copper phthalocyanine pigment dispersion CaboJet 250C (pigment concentration: 10%) manufactured by Cabot Corporation, a self-dispersing magenta pigment dispersion CaboJet 265M (pigment concentration: 10%) manufactured by Cabot Corporation, and a self-dispersing yellow pigment dispersion CaboJet 270Y (pigment concentration: 10%) manufactured by Cabot Corporation were used as a cyan pigment dispersion 2, a magenta pigment dispersion 2 and a yellow pigment dispersion 2 respectively. Further, a self-dispersing carbon black dispersion CaboJet 200 (pigment concentration: 20%) manufactured by Cabot Corporation diluted with an equal amount of water was used as a black pigment dispersion 2 (pigment concentration: 10%).

(Production Example for Fixing Resin 1)

A reaction vessel fitted with a gas inlet tube, a thermometer, a condenser and a stirrer was charged with 20 parts of toluene, 7.5 parts of methacrylic acid and 7.5 parts of methyl methacrylate as polymerizable monomers, 0.9 parts of 2,2'-azobisisobutyronitrile as a polymerization initiator, and 3.6 parts of 2-(dodecylthiocarbonothioylthio)-isobutyric acid. The inside of the reaction vessel was flushed with nitrogen, and the temperature was then raised to 75° C. and a polymerization reaction was conducted over a period of three hours, thus obtaining a copolymer (A block) formed from methacrylic acid and methyl methacrylate.

The mixture in the reaction vessel prior to the nitrogen flushing, and the mixture following the polymerization reaction were analyzed using a gas chromatography-mass spectrometer, and the detection peaks attributable to the methacrylic acid and methyl methacrylate used as raw materials were compared. The results revealed that in the mixture following the polymerization reaction, almost no peaks attributable to the methacrylic acid and methyl methacrylate were observed. It is thought that these results indicate that almost all of the polymerizable monomers polymerized. Further, the weight average molecular weight of the above A block measured using an HLC-8120GPC device manufactured by Tosoh Corporation was about 1,500, and the molecular weight distribution width was 1.4. Moreover, the acid value calculated from the composition of monomers that form the A block was 315.4 mgKOH/g, and the glass transition temperature calculated using the above formula (1) was 117.1° C.

Following completion of the above polymerization reaction, the reaction system was cooled to normal temperature, and 60 parts of toluene, and 60 parts of methyl methacrylate and 25 parts of butyl methacrylate as polymerizable monomers were added to the reaction vessel. The inside of the reaction vessel was flushed with nitrogen, and the temperature was then raised to 75° C. and a polymerization reaction was conducted over a period of three hours, thus obtaining a fixing resin 1 that was an A-B block polymer in which a copolymer (B block) formed from methyl methacrylate and butyl methacrylate had been added to the above A block.

In a similar manner to that described above for the A block, a comparison of the detection peaks attributable to the polymerizable monomers was conducted using a gas chromatography-mass spectrometer. The results confirmed that almost all of the added methyl methacrylate and butyl methacrylate had polymerized, which is thought to indicate formation of the B block. The acid value calculated from the composition of monomers that form the B block was 0 mgKOH/g, and the glass transition temperature calculated using the above formula (1) was 75.3° C.

Subsequently, the reaction system was cooled to normal temperature, a neutralization was performed by adding 9.3 parts of dimethylaminoethanol to the reaction vessel, and 200 parts of water was then added. The thus obtained solution was then heated, and following removal of the toluene by azeotropic distillation of toluene and water, and the amount of water was adjusted to achieve a solid fraction of 30%, thus obtaining a water-based solution of the fixing resin 1 (solid fraction: 30%). The weight average molecular weight of the fixing resin 1 measured using an HLC-8120GPC device manufactured by Tosoh Corporation was about 16,000, and the molecular weight distribution width was 1.6. Further, the acid value calculated from the composition of monomers that form the A block was 48.6 mgKOH/g, and the glass transition temperature calculated using the above formula (1) was 81.0° C.

(Production Examples for Fixing Resins 2 to 50)

With the exceptions of altering the types and amounts (parts) of the polymerizable monomers and the amount (parts) of the dimethylaminoethanol to the conditions shown in Tables 1 to 3, water-based solutions (solid fraction: 30%) of fixing resins 2 to 50 were obtained in the same manner as the above fixing resin 1. The values shown in Tables 1 to 3 for the acid value, the glass transition temperature and the number average molecular weight for each A block, B block, and A-B block polymer were measured or calculated using the same methods as those described for the fixing resin 1. Further, the results of analysis using a gas chromatography-mass spectrometer confirmed that, in each resin, almost all of the added polymerizable monomers had polymerized.

TABLE 1

| | | | | Fixing resin | | | | |
|---|---|---|---|---|---|---|---|---|
| | | | | 1 | 2 | 3 | 4 | 5 |
| A block | Monomers constituting structural units (polymerizable monomers A) | Structural unit (P-1) having an anionic functional group | MAA | 7.5 | 7.0 | 6.5 | 1.7 | 3.0 |
| | | Structural unit having an alkyl group of less than 8 carbon atoms | MMA | 7.5 | 7.0 | 6.5 | 5.0 | 12.0 |
| | Parameters | Acid value (AvA) [mgKOH/g] | | 315.4 | 314.7 | 313.9 | 159.4 | 128.7 |
| | | Glass transition temperature (TgA) [° C.] | | 117.1 | 117.1 | 117.1 | 111.0 | 109.7 |
| | | Number average molecular weight (MnA) | | 1500 | 1400 | 1300 | 650 | 1500 |
| B block | Monomers constituting structural units (polymerizable monomers B) | Structural unit (P-1) having an anionic functional group | MAA | | 0.5 | 1.0 | 0.3 | |
| | | Structural unit having an alkyl group of less than 8 carbon atoms | MMA | 60.0 | 60.5 | 61.0 | 60.0 | 60.0 |
| | | | BMA | 25.0 | 25.0 | 25.0 | 25.0 | 25.0 |
| | Parameters | Acid value (AvB) [mgKOH/g] | | 0 | 3.8 | 7.5 | 2.3 | 0 |
| | | Glass transition temperature (TgB) [° C.] | | 75.3 | 75.7 | 76.1 | 75.5 | 75.3 |
| | Dimethylaminoethanol amount added (parts) | | | 9.3 | 9.3 | 9.3 | 2.1 | 3.7 |
| A-B block polymer | Parameters | Acid value (AvP) [mgKOH/g] | | 48.6 | 48.6 | 48.6 | 12.0 | 19.5 |
| | | Glass transition temperature (TgP) [° C.] | | 81.0 | 81.0 | 81.0 | 77.8 | 80.1 |
| | | Number average molecular weight (MnP) | | 9800 | 10250 | 9900 | 9450 | 10100 |
| | Structural unit proportions | Amount of structural units in A block relative to all structural units in polymer [mol %] | | 17.3% | 16.1% | 15.0% | 8.2% | 16.6% |
| | | Amount of structural units (P-1) in A block relative to all structural units (P-1) in polymer [mol %] | | 100% | 93.3% | 86.7% | 85.0% | 100% |
| | | Amount of structural unit (P-1) relative to all structural units in A block [% by mass] | | 50.0% | 50.0% | 50.0% | 25.4% | 20.0% |

| | | | | Fixing resin | | |
|---|---|---|---|---|---|---|
| | | | | 6 | 7 | 8 |
| A block | Monomers constituting structural units (polymerizable monomers A) | Structural unit (P-1) having an anionic functional group | MAA | 6.0 | 9.5 | 11.0 |
| | | Structural unit having an alkyl group of less than 8 carbon atoms | MMA | 9.0 | 5.5 | 4.0 |
| | Parameters | Acid value (AvA) [mgKOH/g] | | 254.0 | 396.1 | 455.8 |
| | | Glass transition temperature (TgA) [° C.] | | 114.6 | 120.5 | 123.0 |
| | | Number average molecular weight (MnA) | | 1450 | 1500 | 1600 |
| B block | Monomers constituting structural units (polymerizable monomers B) | Structural unit (P-1) having an anionic functional group | MAA | | | |
| | | Structural unit having an alkyl group of less than 8 carbon atoms | MMA | 60.0 | 60.0 | 60.0 |
| | | | BMA | 25.0 | 25.0 | 25.0 |
| | Parameters | Acid value (AvB) [mgKOH/g] | | 0 | 0 | 0 |
| | | Glass transition temperature (TgB) [° C.] | | 75.3 | 75.3 | 75.3 |
| | Dimethylaminoethanol amount added (parts) | | | 7.4 | 11.7 | 13.6 |
| A-B block polymer | Parameters | Acid value (AvP) [mgKOH/g] | | 39.0 | 61.5 | 71.2 |
| | | Glass transition temperature (TgP) [° C.] | | 80.7 | 81.4 | 81.7 |
| | | Number average molecular weight (MnP) | | 10000 | 9950 | 9750 |
| | Structural unit proportions | Amount of structural units in A block relative to all structural units in polymer [mol %] | | 17.1% | 17.6% | 17.8% |
| | | Amount of structural units (P-1) in A block relative to all structural units (P-1) in polymer [mol %] | | 100% | 100% | 100% |
| | | Amount of structural unit (P-1) relative to all structural units in A block [% by mass] | | 40.0% | 63.3% | 73.3% |

| | | | | Fixing resin | | | | |
|---|---|---|---|---|---|---|---|---|
| | | | | 9 | 10 | 11 | 12 | 13 |
| A block | Monomers constituting structural units (polymerizable monomers A) | Structural unit (P-1) having anionic functional group | MAA | 2.5 | 5.0 | 8.5 | 10.5 | 2.5 |
| | | Structural unit having alkyl group of less than 8 carbon atoms | MMA | 2.5 | 5.0 | 8.5 | 10.5 | 2.5 |

TABLE 1-continued

|  |  |  |  |  |  |  |  |  |
|---|---|---|---|---|---|---|---|---|
|  | Parameters | Acid value (AvA) [mgKOH/g] |  | 296.3 | 310.4 | 316.6 | 318.4 | 296.3 |
|  |  | Glass transition temperature (TgA) [° C.] |  | 117.1 | 117.1 | 117.1 | 117.1 | 117.1 |
|  |  | Number average molecular weight (MnA) |  | 450 | 1000 | 1600 | 2200 | 450 |
| B block | Monomers constituting structural units (polymerizable monomers B) | Structural unit (P-1) having anionic functional group | MAA |  |  |  |  |  |
|  |  | Structural unit having alkyl group of less than 8 carbon atoms | MMA | 67.5 | 65.0 | 60.0 | 56.5 | 20.0 |
|  |  |  | BMA | 28.0 | 25.0 | 23.0 | 22.5 | 6.0 |
|  | Parameters | Acid value (AvB) [mgKOH/g] |  | 0 | 0 | 0 | 0 | 0 |
|  |  | Glass transition temperature (TgB) [° C.] |  | 75.4 | 76.8 | 76.9 | 76.2 | 81.3 |
|  | Dimethylaminoethanol amount added (parts) |  |  | 3.1 | 6.2 | 10.5 | 13.0 | 3.1 |
| A-B block polymer | Parameters | Acid value (AvP) [mgKOH/g] |  | 16.1 | 32.4 | 55.1 | 68.1 | 51.7 |
|  |  | Glass transition temperature (TgP) [° C.] |  | 77.2 | 80.5 | 83.1 | 84.0 | 86.6 |
|  |  | Number average molecular weight (MnP) |  | 10050 | 10000 | 9650 | 9550 | 2850 |
|  | Structural unit proportions | Amount of structural units in A block relative to all structural units in polymer [mol %] |  | 5.8% | 11.6% | 19.4% | 23.9% | 18.3% |
|  |  | Amount of structural units (P-1) in A block relative to all structural units (P-1) in polymer [mol %] |  | 100% | 100% | 100% | 100% | 100% |
|  |  | Amount of structural unit (P-1) relative to all structural units in A block [% by mass] |  | 50.0% | 50.0% | 50.0% | 50.0% | 50.0% |

|  |  |  |  | Fixing resin | | | |
|---|---|---|---|---|---|---|---|
|  |  |  |  | 14 | 15 | 16 | 17 |
| A block | Monomers constituting structural units (polymerizable monomers A) | Structural unit(P-1) having anionic functional group | MAA | 2.5 | 12.5 | 12.5 | 12.5 |
|  |  | Structural unit having alkyl group of less than 8 carbon atoms | MMA | 2.5 | 17.5 | 17.5 | 17.5 |
|  | Parameters | Acid value (AvA) [mgKOH/g] |  | 296.3 | 267.9 | 267.9 | 267.9 |
|  |  | Glass transition temperature (TgA) [° C.] |  | 117.1 | 115.0 | 115.0 | 115.0 |
|  |  | Number average molecular weight (MnA) |  | 450 | 3000 | 3000 | 3000 |
| B block | Monomers constituting structural units (polymerizable monomers B) | Structural unit (P-1) having anionic functional group | MAA |  |  |  |  |
|  |  | Structural unit having alkyl group of less than 8 carbon atoms | MMA | 30.0 | 100.0 | 135.0 | 170.0 |
|  |  |  | BMA | 8.5 | 45.0 | 55.0 | 65.0 |
|  | Parameters | Acid value (AvB) [mgKOH/g] |  | 0 | 0 | 0 | 0 |
|  |  | Glass transition temperature (TgB) [° C.] |  | 82.2 | 73.8 | 75.7 | 76.9 |
|  | Dimethylaminoethanol amount added (parts) |  |  | 3.1 | 15.5 | 15.5 | 15.5 |
| A-B block polymer | Parameters | Acid value (AvP) [mgKOH/g] |  | 37.0 | 46.5 | 37.0 | 30.7 |
|  |  | Glass transition temperature (TgP) [° C.] |  | 85.9 | 80.2 | 80.6 | 80.9 |
|  |  | Number average molecular weight (MnP) |  | 4200 | 18000 | 22000 | 27000 |
|  | Structural unit proportions | Amount of structural units in A block relative to all structural units in polymer [mol %] |  | 13.1% | 19.6% | 15.6% | 12.9% |
|  |  | Amount of structural units (P-1) in A block relative to all structural units (P-1) in polymer [mol %] |  | 100% | 100% | 100% | 100% |
|  |  | Amount of structural unit (P-1) relative to all structural units in A block [% by mass] |  | 50.0% | 41.7% | 41.7% | 41.7% |

TABLE 2

|  |  |  |  | Fixing resin | | | |
|---|---|---|---|---|---|---|---|
|  |  |  |  | 18 | 19 | 20 | 21 |
| A block | Monomers constituting structural units (polymerizable monomers A) | Structural unit (P-1) having anionic functional group | AA |  |  |  |  |
|  |  |  | MAA | 7.5 | 7.5 | 7.5 | 7.5 |
|  |  |  | AOES |  |  |  |  |
|  |  |  | MOES |  |  |  |  |
|  |  |  | MOEP |  |  |  |  |
|  |  |  | MOEPh |  |  |  |  |
|  |  | Structural unit having alkyl group of less than 8 carbon atoms | MMA | 7.5 | 7.5 | 7.5 | 7.5 |
|  |  |  | BMA |  |  |  |  |
|  |  | Structural unit (P-2) having alkyl group of 8 to 30 carbon atoms | 2EHMA |  |  |  |  |
|  |  |  | LMA |  |  |  |  |
|  |  | Structural unit (P-3) having aromatic ring | St |  |  |  |  |
|  |  | Structural unit having ethylene oxide group | PEGMA |  |  |  |  |
|  | Parameters | Acid value (AvA) [mgKOH/g] |  | 315.4 | 315.4 | 315.4 | 315.4 |
|  |  | Glass transition temperature (TgA) [° C.] |  | 117.1 | 117.1 | 117.1 | 117.1 |
|  |  | Number average molecular weight (MnA) |  | 1500 | 1500 | 1500 | 1500 |
| B block | Monomers constituting structural units (polymerizable monomers B) | Structural unit having alkyl group of less than 8 carbon atoms | MMA | 85.0 | 78.0 | 65.0 | 56.0 |
|  |  |  | BMA |  | 7.0 | 20.0 | 29.0 |
|  | Parameters | Acid value (AvB) [mgKOH/g] |  | 0 | 0 | 0 | 0 |
|  |  | Glass transition temperature (TgB) [° C.] |  | 105.0 | 96.2 | 80.8 | 71.0 |
|  |  | Dimethylaminoethanol amount added (parts) |  | 9.3 | 9.3 | 9.3 | 9.3 |
| A-B block polymer | Parameters | Acid value (AvP) [mgKOH/g] |  | 48.6 | 48.6 | 48.6 | 48.6 |
|  |  | Glass transition temperature (TgP) [° C.] |  | 106.8 | 99.2 | 85.9 | 77.2 |
|  |  | Number average molecular weight (MnP) |  | 9350 | 9500 | 9600 | 10500 |
|  | Structural unit proportions | Amount of structural units in A block relative to all structural units in polymer [mol %] |  | 16.0% | 16.4% | 17.0% | 17.5% |
|  |  | Amount of structural units (P-1) in A block relative to all structural units (P-1) in polymer [mol %] |  | 100% | 100% | 100% | 100% |
|  |  | Amount of structural unit (P-1) relative to all structural units in A block [% by mass] |  | 50.0% | 50.0% | 50.0% | 50.0% |

|  |  |  |  | Fixing resin | | | |
|---|---|---|---|---|---|---|---|
|  |  |  |  | 22 | 23 | 24 | 25 |
| A block | Monomers constituting structural units (polymerizable monomers A) | Structural unit (P-1) having anionic functional group | AA |  |  |  |  |
|  |  |  | MAA |  | 7.5 |  |  |
|  |  |  | MAA | 7.5 |  |  |  |
|  |  |  | AOES |  |  | 15.0 |  |
|  |  |  | MOES |  |  |  | 15.0 |
|  |  |  | MOEP |  |  |  |  |
|  |  |  | MOEPh |  |  |  |  |
|  |  | Structural unit having alkyl group of less than 8 carbon atoms | MMA | 7.5 | 7.5 | 7.0 | 7.0 |
|  |  |  | BMA |  |  |  |  |
|  |  | Structural unit (P-2) having alkyl group of 8 to 30 carbon atoms | 2EHMA |  |  |  |  |
|  |  |  | LMA |  |  |  |  |
|  |  | Structural unit (P-3) having aromatic ring | St |  |  |  |  |
|  |  | Structural unit having ethylene oxide group | PEGMA |  |  |  |  |

TABLE 2-continued

|  |  |  |  |  |  |  |  |
|---|---|---|---|---|---|---|---|
|  | Parameters | Acid value (AvA) [mgKOH/g] |  | 315.4 | 376.7 | 171.6 | 161.2 |
|  |  | Glass transition temperature (TgA) [° C.] |  | 117.1 | 105.5 | 14.8 | 33.8 |
|  |  | Number average molecular weight (MnA) |  | 1500 | 1500 | 2100 | 2250 |
| B block | Monomers constituting structural units (polymerizable monomers B) | Structural unit having alkyl group of less than 8 carbon atoms | MMA | 50.0 | 60.0 | 53.0 | 53.0 |
|  |  |  | BMA | 35.0 | 25.0 | 25.0 | 25.0 |
|  | Parameters | Acid value (AvB) [mgKOH/g] |  | 0 | 0 | 0 | 0 |
|  |  | Glass transition temperature (TgB) [° C.] |  | 64.7 | 75.3 | 72.8 | 72.8 |
|  | Dimethylaminoethanol amount added (parts) |  |  | 9.3 | 11.1 | 7.4 | 6.9 |
| A-B block polymer | Parameters | Acid value (AvP) [mgKOH/g] |  | 48.6 | 58.1 | 38.7 | 36.3 |
|  |  | Glass transition temperature (TgP) [° C.] |  | 71.6 | 79.5 | 58.2 | 63.4 |
|  |  | Number average molecular weight (MnP) |  | 11500 | 9800 | 10050 | 10000 |
|  | Structural unit proportions | Amount of structural units in A block relative to all structural units in polymer [mol %] |  | 17.9% | 18.8% | 16.5% | 16.1% |
|  |  | Amount of structural units (P-1) in A block relative to all structural units (P-1) in polymer [mol %] |  | 100% | 100% | 100% | 100% |
|  |  | Amount of structural unit (P-1) relative to all structural units in A block [% by mass] |  | 50.0% | 50.0% | 68.2% | 68.2% |

|  |  |  |  | Fixing resin |  |  |  |  |  |  |
|---|---|---|---|---|---|---|---|---|---|---|
|  |  |  |  | 26 | 27 | 28 | 29 | 30 | 31 | 32 |
| A block | Monomers constituting structural units (polymerizable monomers A) | Structural unit (P-1) having anionic functional group | AA |  |  |  |  |  |  |  |
|  |  |  | MAA |  |  | 7.5 | 7.5 | 7.5 | 7.5 | 7.5 |
|  |  |  | AOES |  |  |  |  |  |  |  |
|  |  |  | MOES |  |  |  |  |  |  |  |
|  |  |  | MOEP | 15.0 |  |  |  |  |  |  |
|  |  |  | MOEPh |  | 15.0 |  |  |  |  |  |
|  |  | Structural unit having alkyl group of less than 8 carbon atoms | MMA | 7.0 | 7.0 | 3.0 | 3.0 | 3.0 | 3.0 | 3.0 |
|  |  |  | BMA |  |  | 4.5 |  |  |  |  |
|  |  | Structural unit (P-2) having alkyl group of 8 to 30 carbon atoms | 2EHMA |  |  |  | 4.5 |  |  |  |
|  |  |  | LMA |  |  |  |  | 4.5 |  |  |
|  |  | Structural unit (P-3) having aromatic ring | St |  |  |  |  |  | 4.5 |  |
|  |  | Structural unit having ethylene oxide group | PEGMA |  |  |  |  |  |  | 4.5 |
|  | Parameters | Acid value (AvA) [mgKOH/g] |  | 133.3 | 176.6 | 315.4 | 315.4 | 315.4 | 315.4 | 315.4 |
|  |  | Glass transition temperature (TgA) [° C.] |  | 69.4 | 65.7 | 85.0 | 70.6 | 38.3 | 108.7 | 35.6 |
|  |  | Number average molecular weight (MnA) |  | 2400 | 2450 | 1650 | 1950 | 2200 | 1500 | 1900 |
| B block | Monomers constituting structural units (polymerizable monomers B) | Structural unit having alkyl group of less than 8 carbon atoms | MMA | 53.0 | 53.0 | 60.0 | 60.0 | 60.0 | 60.0 | 60.0 |
|  |  |  | BMA | 25.0 | 25.0 | 25.0 | 25.0 | 25.0 | 25.0 | 25.0 |
|  | Parameters | Acid value (AvB) [mgKOH/g] |  | 0 | 0 | 0 | 0 | 0 | 0 | 0 |
|  |  | Glass transition temperature (TgB) [° C.] |  | 72.8 | 72.8 | 75.3 | 75.3 | 75.3 | 75.3 | 75.3 |
|  | Dimethylaminoethanol amount added (parts) |  |  | 5.7 | 7.6 | 9.3 | 9.3 | 9.3 | 9.3 | 9.3 |
| A-B block polymer | Parameters | Acid value (AvP) [mgKOH/g] |  | 30.0 | 39.8 | 48.6 | 48.6 | 48.6 | 48.6 | 48.6 |
|  |  | Glass transition temperature (TgP) [° C.] |  | 72.1 | 71.2 | 76.7 | 74.6 | 69.2 | 79.9 | 68.7 |
|  |  | Number average molecular weight (MnP) |  | 11100 | 11000 | 10500 | 13500 | 15500 | 11000 | 12200 |
|  | Structural unit proportions | Amount of structural units in A block relative to all structural units in polymer [mol %] |  | 14.9% | 16.7% | 16.1% | 15.3% | 14.8% | 17.1% | 14.1% |

TABLE 2-continued

|  |  |  |  |  |  |  |  |
|---|---|---|---|---|---|---|---|
| Amount of structural units (P-1) in A block relative to all structural units (P-1) in polymer [mol %] | 100% | 100% | 100% | 100% | 100% | 100% | 100% |
| Amount of structural unit (P-1) relative to all structural units in A block [% by mass] | 68.2% | 68.2% | 50.0% | 50.0% | 50.0% | 50.0% | 50.0% |

TABLE 3

|  |  |  |  | Fixing resin | | | | |
|---|---|---|---|---|---|---|---|---|
|  |  |  |  | 33 | 34 | 35 | 36 | 37 |
| A block | Monomers constituting structural units (polymerizable monomers A) | Structural unit (P-1) having anionic functional group | AA |  |  |  |  |  |
|  |  |  | MAA | 7.5 | 7.5 | 7.5 | 7.5 | 7.5 |
|  |  | Structural unit having alkyl group of less than 8 carbon atoms | MMA | 7.5 | 7.5 | 7.5 | 7.5 | 7.5 |
|  | Parameters | Acid value (AvA) [mgKOH/g] |  | 315.4 | 315.4 | 315.4 | 315.4 | 315.4 |
|  |  | Glass transition temperature (TgA) [° C.] |  | 117.1 | 117.1 | 117.1 | 117.1 | 117.1 |
|  |  | Number average molecular weight (MnA) |  | 1500 | 1500 | 1500 | 1500 | 1500 |
| B block | Monomers constituting structural units (polymerizable monomers B) | Structural unit (P-1) having anionic functional group | MAA |  |  |  |  |  |
|  |  | Structural unit having alkyl group of less than 8 carbon atoms | MMA | 60.0 | 60.0 | 60.0 | 60.0 | 60.0 |
|  |  |  | BMA |  |  |  |  |  |
|  |  | Structural unit (P-2) having alkyl group of 8 to 30 carbon atoms | 2EHMA | 25.0 |  |  |  |  |
|  |  |  | LMA |  | 25.0 |  |  |  |
|  |  |  | LA |  |  | 25.0 |  |  |
|  |  |  | STMA |  |  |  | 12.5 |  |
|  |  |  | VMA |  |  |  | 12.5 | 25.0 |
|  |  | Structural unit (P-3) having aromatic ring | St |  |  |  |  |  |
|  |  |  | BzMA |  |  |  |  |  |
|  |  |  | PEA |  |  |  |  |  |
|  | Parameters | Acid value (AvB) [mgKOH/g] |  | 0 | 0 | 0 | 0 | 0 |
|  |  | Glass transition temperature (TgB) [° C.] |  | 61.9 | 31.8 | 65.2 | 73.6 | 82.5 |
|  | Dimethylaminoethanol amount added (parts) |  |  | 9.3 | 9.3 | 9.3 | 9.3 | 9.3 |
| A-B block polymer | Parameters | Acid value (AvP) [mgKOH/g] |  | 48.6 | 48.6 | 48.6 | 48.6 | 48.6 |
|  |  | Glass transition temperature (TgP) [° C.] |  | 69.2 | 42.1 | 72.1 | 79.5 | 87.3 |
|  |  | Number average molecular weight (MnP) |  | 13000 | 14000 | 14000 | 15100 | 16500 |
|  | Structural unit proportions | Amount of structural units in A block relative to all structural units in polymer [mol %] |  | 18.3% | 18.9% | 18.7% | 19.1% | 19.4% |
|  |  | Amount of structural units (P-1) in A block relative to all structural units (P-1) in polymer [mol %] |  | 100% | 100% | 100% | 100% | 100% |
|  |  | Amount of structural unit (P-1) relative to all structural units in A block [% by mass] |  | 50.0% | 50.0% | 50.0% | 50.0% | 50.0% |

|  |  |  |  | Fixing resin | | | |
|---|---|---|---|---|---|---|---|
|  |  |  |  | 38 | 39 | 40 | 41 |
| A block | Monomers constituting structural units (polymerizable monomers A) | Structural unit (P-1) having anionic functional group | AA |  |  |  |  |
|  |  |  | MAA | 7.5 | 7.5 | 7.5 | 7.5 |
|  |  | Structural unit having alkyl group of less than 8 carbon atoms | MMA | 7.5 | 7.5 | 7.5 | 7.5 |

TABLE 3-continued

|  |  |  |  |  |  |  |  |
|---|---|---|---|---|---|---|---|
|  | Parameters | Acid value (AvA) [mgKOH/g] |  | 315.4 | 315.4 | 315.4 | 315.4 |
|  |  | Glass transition temperature (TgA) [° C.] |  | 117.1 | 117.1 | 117.1 | 117.1 |
|  |  | Number average molecular weight (MnA) |  | 1500 | 1500 | 1500 | 1500 |
| B block | Monomers constituting structural units (polymerizable monomers B) | Structural unit (P-1) having anionic functional group | MAA |  |  |  |  |
|  |  | Structural unit having alkyl group of less than 8 carbon atoms | MMA BMA | 60.0 | 60.0 | 60.0 | 60.0 |
|  |  | Structural unit (P-2) having alkyl group of 8 to 30 carbon atoms | 2EHMA LMA LA STMA VMA | 25.0 |  |  |  |
|  |  | Structural unit (P-3) having aromatic ring | St BzMA PEA |  | 25.0 | 25.0 | 25.0 |
|  | Parameters | Acid value (AvB) [mgKOH/g] |  | 0 | 0 | 0 | 0 |
|  |  | Glass transition temperature (TgB) [° C.] |  | 88.8 | 97.3 | 88.4 | 56.0 |
|  | Dimethylaminoethanol amount added (parts) |  |  | 9.3 | 9.3 | 9.3 | 9.3 |
| A-B block polymer | Parameters | Acid value (AvP) [mgKOH/g] |  | 48.6 | 48.6 | 48.6 | 48.6 |
|  |  | Glass transition temperature (TgP) [° C.] |  | 92.8 | 100.1 | 92.5 | 64.0 |
|  |  | Number average molecular weight (MnP) |  | 17000 | 9800 | 10500 | 12500 |
|  | Structural unit proportions | Amount of structural units in A block relative to all structural units in polymer [mol %] |  | 19.7% | 16.2% | 17.9% | 18.2% |
|  |  | Amount of structural units (P-1) in A block relative to all structural units (P-1) in polymer [mol %] |  | 100% | 100% | 100% | 100% |
|  |  | Amount of structural unit (P-1) relative to all structural units in A block [% by mass] |  | 50.0% | 50.0% | 50.0% | 50.0% |

|  |  |  |  | Fixing resin |  |  |  |  |
|---|---|---|---|---|---|---|---|---|
|  |  |  |  | 42 | 43 | 44 | 45 | 46 |
| A block | Monomers constituting structural units (polymerizable monomers A) | Structural unit (P-1) having anionic functional group | AA MAA |  7.5 | 7.5 | 5.0 | 2.5 2.5 |  |
|  |  | Structural unit having alkyl group of less than 8 carbon atoms | MMA | 7.5 | 7.5 | 5.0 | 5.0 | 15.0 |
|  | Parameters | Acid value (AvA) [mgKOH/g] |  | 315.4 | 315.4 | 310.4 | 340.6 | 0.0 |
|  |  | Glass transition temperature (TgA) [° C.] |  | 117.1 | 117.1 | 117.1 | 111.2 | 105.0 |
|  |  | Number average molecular weight (MnA) |  | 1500 | 1500 | 1050 | 1000 | 1500 |
| B block | Monomers constituting structural units (polymerizable monomers B) | Structural unit (P-1) having anionic functional group | MAA |  |  |  |  |  |
|  |  | Structural unit having alkyl group of less than 8 carbon atoms | MMA BMA | 60.0 | 60.0 | 65.0 | 65.0 | 60.0 25.0 |
|  |  | Structural unit (P-2) having alkyl group of 8 to 30 carbon atoms | 2EHMA LMA LA STMA VMA | 15.0 | 15.0 | 15.0 | 10.0 5.0 |  |
|  |  | Structural unit (P-3) having aromatic ring | St BzMA PEA | 10.0 | 10.0 | 10.0 | 10.0 |  |
|  | Parameters | Acid value (AvB) [mgKOH/g] |  | 0 | 0 | 0 | 0 | 0 |
|  |  | Glass transition temperature (TgB) [° C.] |  | 77.4 | 88.3 | 89.1 | 83.3 | 75.3 |
|  | Dimethylaminoethanol amount added (parts) |  |  | 9.3 | 9.3 | 6.2 | 6.8 | 0.0 |

TABLE 3-continued

| | | | | | | | | |
|---|---|---|---|---|---|---|---|---|
| A-B block polymer | Parameters | Acid value (AvP) [mgKOH/g] | | 48.6 | 48.6 | 32.4 | 35.6 | 0.0 |
| | | Glass transition temperature (TgP) [° C.] | | 82.8 | 92.3 | 91.8 | 85.9 | 79.4 |
| | | Number average molecular weight (MnP) | | 12500 | 14000 | 13000 | 14550 | 9900 |
| | Structural unit proportions | Amount of structural units in A block relative to all structural units in polymer [mol %] | | 17.6% | 18.0% | 12.0% | 12.4% | 16.2% |
| | | Amount of structural units (P-1) in A block relative to all structural units (P-1) in polymer [mol %] | | 100% | 100% | 100% | 100% | — |
| | | Amount of structural unit (P-1) relative to all structural units in A block [% by mass] | | 50.0% | 50.0% | 50.0% | 50.0% | 0.0% |

| | | | | Fixing resin | | | |
|---|---|---|---|---|---|---|---|
| | | | | 47 | 48 | 49 | 50 |
| A block | Monomers constituting structural units (polymerizable monomers A) | Structural unit (P-1) having anionic functional group | AA | | | | |
| | | | MAA | 6.0 | 2.0 | 11.5 | 11.0 |
| | | Structural unit having alkyl group of less than 8 carbon atoms | MMA | 6.0 | 2.0 | 11.5 | 11.0 |
| | Parameters | Acid value (AvA) [mgKOH/g] | | 312.9 | 289.7 | 319.0 | 318.7 |
| | | Glass transition temperature (TgA) [° C.] | | 117.1 | 117.1 | 117.1 | 117.1 |
| | | Number average molecular weight (MnA) | | 1200 | 450 | 2250 | 2200 |
| B block | Monomers constituting structural units (polymerizable monomers B) | Structural unit (P-1) having anionic functional group | MAA | 1.5 | | | 1.5 |
| | | Structural unit having alkyl group of less than 8 carbon atoms | MMA | 61.5 | 68.0 | 55.0 | 54.5 |
| | | | BMA | 25.0 | 28.0 | 22.0 | 22.0 |
| | | Structural unit (P-2) having alkyl group of 8 to 30 carbon atoms | 2EHMA | | | | |
| | | | LMA | | | | |
| | | | LA | | | | |
| | | | STMA | | | | |
| | | | VMA | | | | |
| | | Structural unit (P-3) having aromatic ring | St | | | | |
| | | | BzMA | | | | |
| | | | PEA | | | | |
| | Parameters | Acid value (AvB) [mgKOH/g] | | 11.1 | 0 | 0 | 12.5 |
| | | Glass transition temperature (TgB) [° C.] | | 76.6 | 75.5 | 76.4 | 77.1 |
| | Dimethylaminoethanol amount added (parts) | | | 9.3 | 2.5 | 14.2 | 15.5 |
| A-B block polymer | Parameters | Acid value (AvP) [mgKOH/g] | | 48.6 | 13.0 | 74.6 | 81.1 |
| | | Glass transition temperature (TgP) [° C.] | | 81.0 | 77.0 | 84.7 | 84.9 |
| | | Number average molecular weight (MnP) | | 10500 | 11000 | 9700 | 9550 |
| | Structural unit proportions | Amount of structural units in A block relative to all structural units in polymer [mol %] | | 13.8% | 4.7% | 26.1% | 24.9% |
| | | Amount of structural units (P-1) in A block relative to all structural units (P-1) in polymer [mol %] | | 80.0% | 100.0% | 100.0% | 88.0% |
| | | Amount of structural unit (P-1) relative to all structural units in A block [% by mass] | | 50.0% | 50.0% | 50.0% | 50.0% |

The abbreviations used in Tables 1 to 3 have the following meanings.
(Structural Unit (P-1) Having an Anionic Functional Group)
  AA: acrylic acid
  MAA: methacrylic acid
  AOES: acryloyloxyethylsuccinic acid
  MOES: methacryloyloxyethylsuccinic acid
  MOEP: methacryloyloxyethylphthalic acid
  MOEPh: methacryloyloxyethylphosphonic acid
(Structural Unit Having an Alkyl Group of Less than 8 Carbon Atoms)
  MMA: methyl methacrylate
  BMA: butyl methacrylate
(Structural Unit (P-2) Having an Alkyl Group of 8 to 30 Carbon Atoms)
  2EHMA: 2-ethylhexyl methacrylate
  LA: lauryl acrylate
  LMA: lauryl methacrylate
  StMA: stearyl methacrylate
  VMA: behenyl methacrylate
(Structural Unit (P-3) having an Aromatic Ring)
  St: styrene
  BzMA: benzyl methacrylate
  PEA: phenoxyethyl methacrylate
(Structural Unit Having an Ethylene Oxide Group)
  PEGMA: methoxy polyethylene glycol #400 methacrylate
(Production Example for Fixing Resin 51)

A reaction vessel fitted with a gas inlet tube, a thermometer, a condenser and a stirrer was charged with 93.4 parts of butanol, and the vessel was then flushed with nitrogen gas. The inside of the reaction vessel was then heated to 110° C., and a mixture containing 7.5 parts of methacrylic acid, 67.5 parts of methyl methacrylate and 25.0 parts of butyl methacrylate as polymerizable monomers and 9 parts of V-601 (manufactured by Wako Pure Chemical Industries, Ltd.) as a polymerization initiator was added dropwise to the vessel over two hours to perform a polymerization reaction. Following completion of the dropwise addition, reaction was continued at 110° C. for a further three hours, an additional 0.9 parts of V-601 (manufactured by Wako Pure Chemical Industries, Ltd.) was added, and the reaction was continued at 110° C. for a further one hour.

The reaction system was then cooled to normal temperature, and following the addition of 9.3 parts of dimethylaminoethanol to perform a neutralization, 100 parts of water was added to obtain a water-based solution. Subsequently, the obtained solution was heated to at least 100° C., the butanol was removed by azeotropic distillation with water, and the amount of water was adjusted to achieve a solid fraction of 30%, thus obtaining a water-based solution of a fixing resin 51 (solid fraction: 30%). The weight average molecular weight of the fixing resin 51 measured using an HLC-8120GPC device manufactured by Tosoh Corporation was about 11,000, and the molecular weight distribution width was 2.1. Further, the acid value calculated from the composition of monomers that form the fixing resin 51 was 48.6 mgKOH/g, and the glass transition temperature calculated using the above formula (1) was 81.0° C.
(Production Example for Inks 1 (Four Colors: 1C, 1M, 1Y and 1K)

A mixing vessel was charged with 40.0 parts of the cyan pigment dispersion 1, 16.7 parts of the water-based solution (solid fraction: 30%) of the fixing resin 1 (solid fraction equivalent: 5.0 parts), 25.0 parts of 1,2-propanediol, 5.0 parts of 1,2-hexanediol, 5.0 parts of diethylene glycol monobutyl ether, 1.5 parts of TEGO Wet 280, and 0.5 parts of triethanolamine, and water was added to bring the total up to 100 parts. The resulting mixture was stirred thoroughly used a Disper (stirrer) until uniform, and the thus obtained mixture was then filtered through a membrane filter having a pore size of 1 μm to remove the coarse particles that can cause head blockages, thus obtaining an ink 1C.

Further, with the exception of replacing the above cyan pigment dispersion 1 with the magenta pigment dispersion 1, the yellow pigment dispersion 1 or the black pigment dispersion 1, inks 1M, 1Y and 1K were obtained in the same manner as the above ink 1C.
(Production Examples for Inks 2 to 81)

With the exception of altering the types and amounts (parts) of the materials to the conditions shown in Tables 4 to 8, inks 2 to 81 (each including the four inks of C, M, Y and K) were produced in the same manner as the ink 1C. In the production of the M, Y and K inks, each of the cyan pigment dispersions shown in Tables 4 to 8 was replaced with the corresponding magenta pigment dispersion, yellow pigment dispersion or black pigment dispersion respectively.

TABLE 4

| | | | | Example 1 | Example 2 | Example 3 | Example 4 | Example 5 | Example 6 | Example 7 | Example 8 |
|---|---|---|---|---|---|---|---|---|---|---|---|
| | | | Ink No. | 1 | 2 | 3 | 4 | 5 | 6 | 7 | 8 |
| Pigment dispersion (pigment concentration: 10%) | | | Amount added | cyan 1 40 | cyan 1 40 | cyan 1 40 | cyan 1 40 | cyan 1 40 | cyan 1 40 | cyan 1 40 | cyan 1 40 |
| Fixing resin | | | | fixing resin 1 | fixing resin 2 | fixing resin 3 | fixing resin 4 | fixing resin 5 | fixing resin 6 | fixing resin 7 | fixing resin 8 |
| | | | Amount added (solid fraction equivalent) | 5 | 5 | 5 | 5 | 5 | 5 | 5 | 5 |
| Organic solvent | Low SP value solvent | 1,2PD | SP = 13.5, BP = 188° C. | 25 | 25 | 25 | 25 | 25 | 25 | 25 | 25 |
| | | 1,2HexD | SP = 11.8, BP = 223° C. | 5 | 5 | 5 | 5 | 5 | 5 | 5 | 5 |
| | | BDG | SP = 10.5, BP = 231° C. | 5 | 5 | 5 | 5 | 5 | 5 | 5 | 5 |
| Surfactant | Siloxane-based | General formula (3) | TEGO Wet 280 | 1.5 | 1.5 | 1.5 | 1.5 | 1.5 | 1.5 | 1.5 | 1.5 |
| | pH adjuster | | Triethanolamine | 0.5 | 0.5 | 0.5 | 0.5 | 0.5 | 0.5 | 0.5 | 0.5 |
| | | | Water | 18 | 18 | 18 | 18 | 18 | 18 | 18 | 18 |

TABLE 4-continued

|  |  |  |  | Example 9 | Example 10 | Example 11 | Example 12 | Example 13 | Example 14 | Example 15 |
|---|---|---|---|---|---|---|---|---|---|---|
|  |  |  | Ink No. | 9 | 10 | 11 | 12 | 13 | 14 | 15 |
| Pigment dispersion (pigment concentration: 10%) |  |  | Amount added | cyan 1 40 | cyan 1 40 | cyan 1 40 | cyan 1 40 | cyan 1 40 | cyan 1 40 | cyan 1 40 |
| Fixing resin |  |  |  | fixing resin 9 | fixing resin 10 | fixing resin 11 | fixing resin 12 | fixing resin 13 | fixing resin 14 | fixing resin 15 |
|  |  |  | Amount added (solid fraction equivalent) | 5 | 5 | 5 | 5 | 5 | 5 | 5 |
| Organic solvent | Low SP value solvent | 1,2PD | SP = 13.5, BP = 188° C. | 25 | 25 | 25 | 25 | 25 | 25 | 25 |
|  |  | 1,2HexD | SP = 11.8, BP = 223° C. | 5 | 5 | 5 | 5 | 5 | 5 | 5 |
|  |  | BDG | SP = 10.5, BP = 231° C. | 5 | 5 | 5 | 5 | 5 | 5 | 5 |
| Surfactant | Siloxane-based | General formula (3) | TEGO Wet 280 | 1.5 | 1.5 | 1.5 | 1.5 | 1.5 | 1.5 | 1.5 |
|  | pH adjuster |  | Triethanolamine | 0.5 | 0.5 | 0.5 | 0.5 | 0.5 | 0.5 | 0.5 |
|  |  |  | Water | 18 | 18 | 18 | 18 | 18 | 18 | 18 |

TABLE 5

|  |  |  |  | Example 16 | Example 17 | Example 18 | Example 19 | Example 20 | Example 21 | Example 22 | Example 23 |
|---|---|---|---|---|---|---|---|---|---|---|---|
|  |  |  | Ink No. | 16 | 17 | 18 | 19 | 20 | 21 | 22 | 23 |
| Pigment dispersion (pigment concentration: 10%) |  |  | Amount added | cyan 1 40 | cyan 1 40 | cyan 1 40 | cyan 1 40 | cyan 1 40 | cyan 1 40 | cyan 1 40 | cyan 1 40 |
| Fixing resin |  |  |  | fixing resin 16 | fixing resin 17 | fixing resin 18 | fixing resin 19 | fixing resin 20 | fixing resin 21 | fixing resin 22 | fixing resin 23 |
|  |  |  | Amount added (solid fraction equivalent) | 5 | 5 | 5 | 5 | 5 | 5 | 5 | 5 |
| Organic solvent | Low SP value solvent | 1,2PD | SP = 13.5, BP = 188° C. | 25 | 25 | 25 | 25 | 25 | 25 | 25 | 25 |
|  |  | 1,2HexD | SP = 11.8, BP = 223° C. | 5 | 5 | 5 | 5 | 5 | 5 | 5 | 5 |
|  |  | BDG | SP = 10.5, BP = 231° C. | 5 | 5 | 5 | 5 | 5 | 5 | 5 | 5 |
| Surfactant | Siloxane-based | General formula (3) | TEGO Wet 280 | 1.5 | 1.5 | 1.5 | 1.5 | 1.5 | 1.5 | 1.5 | 1.5 |
|  | pH adjuster |  | Triethanolamine | 0.5 | 0.5 | 0.5 | 0.5 | 0.5 | 0.5 | 0.5 | 0.5 |
|  |  |  | Water | 18 | 18 | 18 | 18 | 18 | 18 | 18 | 18 |

|  |  |  |  | Example 24 | Example 25 | Example 26 | Example 27 | Example 28 | Example 29 | Example 30 |
|---|---|---|---|---|---|---|---|---|---|---|
|  |  |  | Ink No. | 24 | 25 | 26 | 27 | 28 | 29 | 30 |
| Pigment dispersion (pigment concentration: 10%) |  |  | Amount added | cyan 1 40 | cyan 1 40 | cyan 1 40 | cyan 1 40 | cyan 1 40 | cyan 1 40 | cyan 1 40 |
| Fixing resin |  |  |  | fixing resin 24 | fixing resin 25 | fixing resin 26 | fixing resin 27 | fixing resin 28 | fixing resin 29 | fixing resin 30 |
|  |  |  | Amount added (solid fraction equivalent) | 5 | 5 | 5 | 5 | 5 | 5 | 5 |
| Organic solvent | Low SP value solvent | 1,2PD | SP = 13.5, BP = 188° C. | 25 | 25 | 25 | 25 | 25 | 25 | 25 |
|  |  | 1,2HexD | SP = 11.8, BP = 223° C. | 5 | 5 | 5 | 5 | 5 | 5 | 5 |
|  |  | BDG | SP = 10.5, BP = 231° C. | 5 | 5 | 5 | 5 | 5 | 5 | 5 |
| Surfactant | Siloxane-based | General formula (3) | TEGO Wet 280 | 1.5 | 1.5 | 1.5 | 1.5 | 1.5 | 1.5 | 1.5 |
|  | pH adjuster |  | Triethanolamine | 0.5 | 0.5 | 0.5 | 0.5 | 0.5 | 0.5 | 0.5 |
|  |  |  | Water | 18 | 18 | 18 | 18 | 18 | 18 | 18 |

TABLE 6

| | | | | Example 31 | Example 32 | Example 33 | Example 34 | Example 35 | Example 36 | Example 37 | Example 38 |
|---|---|---|---|---|---|---|---|---|---|---|---|
| | | | Ink No. | 31 | 32 | 33 | 34 | 35 | 36 | 37 | 38 |
| Pigment dispersion (pigment concentration: 10%) | | | Amount added | cyan 1 40 | cyan 1 40 | cyan 1 40 | cyan 1 40 | cyan 1 40 | cyan 1 40 | cyan 1 40 | cyan 1 40 |
| Fixing resin | | | | fixing resin 31 | fixing resin 32 | fixing resin 33 | fixing resin 34 | fixing resin 35 | fixing resin 36 | fixing resin 37 | fixing resin 38 |
| | | | Amount added (solid fraction equivalent) | 5 | 5 | 5 | 5 | 5 | 5 | 5 | 5 |
| Organic solvent | Low SP value solvent | 1,2PD | SP = 13.5, BP = 188° C. | 25 | 25 | 25 | 25 | 25 | 25 | 25 | 25 |
| | | 1,2HexD | SP = 11.8, BP = 223° C. | 5 | 5 | 5 | 5 | 5 | 5 | 5 | 5 |
| | | BDG | SP = 10.5, BP = 231° C. | 5 | 5 | 5 | 5 | 5 | 5 | 5 | 5 |
| Surfactant | Siloxane-based | General formula (3) | TEGO Wet 280 | 1.5 | 1.5 | 1.5 | 1.5 | 1.5 | 1.5 | 1.5 | 1.5 |
| | pH adjuster | | Triethanolamine | 0.5 | 0.5 | 0.5 | 0.5 | 0.5 | 0.5 | 0.5 | 0.5 |
| | | | Water | 18 | 18 | 18 | 18 | 18 | 18 | 18 | 18 |

| | | | | Example 39 | Example 40 | Example 41 | Example 42 | Example 43 | Example 44 | Example 45 |
|---|---|---|---|---|---|---|---|---|---|---|
| | | | Ink No. | 39 | 40 | 41 | 42 | 43 | 44 | 45 |
| Pigment dispersion (pigment concentration: 10%) | | | Amount added | cyan 1 40 | cyan 1 40 | cyan 1 40 | cyan 1 40 | cyan 1 40 | cyan 1 40 | cyan 1 40 |
| Fixing resin | | | | fixing resin 39 | fixing resin 40 | fixing resin 41 | fixing resin 42 | fixing resin 43 | fixing resin 44 | fixing resin 45 |
| | | | Amount added (solid fraction equivalent) | 5 | 5 | 5 | 5 | 5 | 5 | 5 |
| Organic solvent | Low SP value solvent | 1,2PD | SP = 13.5, BP = 188° C. | 25 | 25 | 25 | 25 | 25 | 25 | 25 |
| | | 1,2HexD | SP = 11.8, BP = 223° C. | 5 | 5 | 5 | 5 | 5 | 5 | 5 |
| | | BDG | SP = 10.5, BP = 231° C. | 5 | 5 | 5 | 5 | 5 | 5 | 5 |
| Surfactant | Siloxane-based | General formula (3) | TEGO Wet 280 | 1.5 | 1.5 | 1.5 | 1.5 | 1.5 | 1.5 | 1.5 |
| | pH adjuster | | Triethanolamine | 0.5 | 0.5 | 0.5 | 0.5 | 0.5 | 0.5 | 0.5 |
| | | | Water | 18 | 18 | 18 | 18 | 18 | 18 | 18 |

TABLE 7

| | | | | Example 46 | Example 47 | Example 48 | Example 49 | Example 50 |
|---|---|---|---|---|---|---|---|---|
| | | | Ink No. | 46 | 47 | 48 | 49 | 50 |
| Pigment dispersion (pigment concentration: 10%) | | | Amount added | cyan 1 40 | cyan 1 40 | cyan 1 40 | cyan 1 40 | cyan 1 40 |
| | | | | fixing resin 1 | fixing resin 1 | fixing resin 1 | fixing resin 1 | fixing resin 1 |
| Fixing resin | | | Amount added (solid fraction equivalent) Amount added (solid fraction equivalent) | 1 | 3 | 5 | 8.5 | 11 |
| Organic solvent | Low SP value solvent | 1,2PD | SP = 13.5, BP = 188° C. | 25 | 25 | 15 | 15 | 15 |
| | | 1,2HexD | SP = 11.8, BP = 223° C. | 5 | 5 | | | |
| | | TPG | SP = 12.1, BP = 273° C. | | | | | |
| | | BDG | SP = 10.5, BP = 231° C. | 5 | 5 | 5 | 5 | 5 |

TABLE 7-continued

| | | | | | | | | |
|---|---|---|---|---|---|---|---|---|
| Surfactant | Siloxane-based | General formula (3) | TEGO Wet 280 | 1.5 | 1.5 | 1.5 | 1.5 | 1.5 |
| | | General formula (5) | BYK-333 TEGO Glide 440 | | | | | |
| | Acetylene-based | General formula (6) | Surfynol 104 Surfynol DF110D Surfynol 485 | | | | | |
| | pH adjuster | | Triethanolamine | 0.5 | 0.5 | 0.5 | 0.5 | 0.5 |
| | | | Water | 22 | 20 | 33 | 29.5 | 27 |

| | | | | Example 51 | Example 52 | Example 53 | Example 54 | Example 55 |
|---|---|---|---|---|---|---|---|---|
| | | Ink No. | | 51 | 52 | 53 | 54 | 55 |
| Pigment dispersion (pigment concentration: 10%) | | | Amount added | cyan 2 40 | cyan 1 40 | cyan 1 40 | cyan 1 40 | cyan 1 40 |
| | | | | fixing resin 1 | fixing resin 1 | fixing resin 1 | fixing resin 1 | fixing resin 1 |
| Fixing resin | | | Amount added (solid fraction equivalent) | 5 | 3 | 3 | 4 | 4 |
| | | | | | JDX6500 | J734 | AQ515 | NZ1004 |
| | | | Amount added (solid fraction equivalent) | | 2 | 2 | 1 | 1 |
| Organic solvent | Low SP value solvent | 1,2PD | SP = 13.5, BP = 188° C. | 25 | 25 | 25 | 25 | 25 |
| | | 1,2HexD | SP = 11.8, BP = 223° C. | 5 | 5 | 5 | 5 | 5 |
| | | TPG | SP = 12.1, BP = 273° C. | | | | | |
| | | BDG | SP = 10.5, BP = 231° C. | 5 | 5 | 5 | 5 | 5 |
| Surfactant | Siloxane-based | General formula (3) | TEGO Wet 280 | 1.5 | 1.5 | 1.5 | 1..5 | 1.5 |
| | | General formula (5) | BYK-333 TEGO Glide 440 | | | | | |
| | Acetylene-based | General formula (6) | Surfynol 104 Surfynol DF110D Surfynol 485 | | | | | |
| | pH adjuster | | Triethanolamine | 0.5 | 0.5 | 0.5 | 0.5 | 0.5 |
| | | | Water | 18 | 18 | 18 | 18 | 18 |

| | | | | Example 56 | Example 57 | Example 58 | Example 59 | Example 60 |
|---|---|---|---|---|---|---|---|---|
| | | Ink No. | | 56 | 57 | 58 | 59 | 60 |
| Pigment dispersion (pigment concentration: 10%) | | | Amount added | cyan 1 40 | cyan 1 40 | cyan 1 40 | cyan 1 40 | cyan 1 40 |
| | | | | fixing resin 42 | fixing resin 42 | fixing resin 42 | fixing resin 42 | fixing resin 1 |
| Fixing resin | | | Amount added (solid fraction equivalent) | 5 | 5 | 5 | 5 | 5 |
| | | | Amount added (solid fraction equivalent) | | | | | |
| Organic solvent | Low SP value solvent | 1,2PD | SP = 13.5, BP = 188° C. | 25 | 25 | 25 | 25 | 25 |
| | | 1,2HexD | SP = 11.8, BP = 223° C. | 4 | 2 | | | 5 |
| | | TPG | SP = 12.1, BP = 273° C. | 1 | 3 | 5 | 7 | |
| | | BDG | SP = 10.5, BP = 231° C. | 5 | 5 | 5 | 3 | 5 |
| Surfactant | Siloxane-based | General formula (3) | TEGO Wet 280 | 1.5 | 1.5 | 1.5 | 1.5 | |
| | | General formula (5) | BYK-333 TEGO Glide 440 | | | | | |

TABLE 7-continued

|  |  |  |  | | | | | |
|---|---|---|---|---|---|---|---|---|
| Acetylene-based | General formula (6) | Surfynol 104 | | | | | | |
| | | Surfynol DF110D | | | | | | |
| | | Surfynol 485 | | | | | | |
| pH adjuster | | Triethanolamine | 0.5 | 0.5 | 0.5 | 0.5 | 0.5 | |
| | | Water | 18 | 18 | 18 | 18 | 19.5 | |

| | | | Example 61 | Example 62 | Example 63 | Example 64 | Example 65 |
|---|---|---|---|---|---|---|---|
| | | Ink No. | 61 | 62 | 63 | 64 | 65 |
| Pigment dispersion (pigment concentration: 10%) | | Amount added | cyan 2 40 | cyan 1 40 | cyan 1 40 | cyan 1 40 | cyan 1 40 |
| Fixing resin | | | fixing resin 1 | fixing resin 1 | fixing resin 1 | fixing resin 1 | fixing resin 1 |
| | | Amount added (solid fraction equivalent) | 5 | 5 | 5 | 5 | 5 |
| | | Amount added (solid fraction equivalent) | | | | | |
| Organic solvent | Low SP value solvent | 1,2PD | 25 | 25 | 25 | 25 | 25 |
| | | SP = 13.5, BP = 188° C. | | | | | |
| | | 1,2HexD | 5 | 5 | 5 | 5 | 5 |
| | | SP = 11.8, BP = 223° C. | | | | | |
| | | TPG | | | | | |
| | | SP = 12.1, BP = 273° C. | | | | | |
| | | BDG | 5 | 5 | 5 | 5 | 5 |
| | | SP = 10.5, BP = 231° C. | | | | | |
| Surfactant | Siloxane-based | General formula (3) | TEGO Wet 280 | | | | |
| | | General formula (5) | BYK-333 | 1.5 | | | | |
| | | | TEGO Glide 440 | | 1.5 | | | |
| Acetylene-based | General formula (6) | Surfynol 104 | | | 1.5 | | |
| | | Surfynol DF110D | | | | 1.5 | |
| | | Surfynol 485 | | | | | 1.5 |
| pH adjuster | | Triethanolamine | 0.5 | 0.5 | 0.5 | 0.5 | 0.5 |
| | | Water | 18 | 18 | 18 | 18 | 18 |

TABLE 8

| | | | | Example 66 | Example 67 | Example 68 | Example 69 | Example 70 | Example 71 | Example 72 |
|---|---|---|---|---|---|---|---|---|---|---|
| | | | Ink No. | 66 | 67 | 68 | 69 | 70 | 71 | 72 |
| Pigment dispersion (pigment concentration: 10%) | | | Amount added | cyan 1 40 | cyan 1 40 | cyan 1 40 | cyan 2 40 | cyan 1 40 | cyan 1 40 | cyan 2 60 |
| Fixing resin | | | | fixing resin 1 | fixing resin 43 | fixing resin 43 | fixing resin 43 | fixing resin 43 | fixing resin 43 | fixing resin 43 |
| | | | Amount added (solid fraction equivalent) | 5 | 5 | 5 | 5 | 5 | 5 | 5 |
| Organic solvent | Low SP value solvent | MB | SP = 10.9, BP = 158° C. | | | | | | 5 | |
| | | 1,2PD | SP = 13.5, BP = 188° C. | 25 | | | | | | 10 |
| | | 1,2BD | SP = 12.7, BP = 194° C. | | | 25 | | 20 | 20 | |
| | | 1,2HexD | SP = 11.8, BP = 223° C. | 5 | | | | | 10 | |
| | | 3Me1,5PenD | SP = 13.4, BP = 249° C. | | | | | | 5 | |
| | | iPDG | SP = 10.6, BP = 207° C. | | | | 25 | | | |
| | | BDG | SP = 10.5, BP = 231° C. | 5 | 5 | 5 | | | | |
| | | MPG | SP = 10.9, BP = 121° C. | | | | | | | 5 |

TABLE 8-continued

|  |  |  |  |  |  |  |  |  |  |  |
|---|---|---|---|---|---|---|---|---|---|---|
|  | Other solvent | 1,3BD | SP = 14.8, BP = 207° C. |  | 25 |  |  |  |  |  |
|  |  | DEG | SP = 15.0, BP = 244° C. |  | 5 |  |  |  |  |  |
|  |  | Gly | SP = 16.4, BP = 290° C. |  |  |  |  |  |  |  |
| Surfactant | Siloxane-based | General formula (3) | TEGO Wet 280 | 1.5 | 1.5 | 1.5 | 1.5 | 1.5 | 1.5 | 1.5 |
|  | Acetylene-based | General formula (6) | Surfynol104 | 1.5 | 1.5 | 1.5 | 1.5 | 1.5 | 1.5 | 1.5 |
|  | pH adjuster |  | Triethanolamine | 0.5 | 0.5 | 0.5 | 0.5 | 0.5 | 0.5 | 0.5 |
|  |  |  | Water | 16.5 | 21.5 | 21.5 | 21.5 | 21.5 | 16.5 | 21.5 |

|  |  |  |  | Example 73 | Example 74 | Example 75 | Comparative Example 1 | Comparative Example 2 |
|---|---|---|---|---|---|---|---|---|
|  |  | Ink No. |  | 73 | 74 | 75 | 76 | 77 |
| Pigment dispersion (pigment concentration: 10%) |  |  | Amount added | cyan 1 25 | cyan 1 40 | cyan 2 40 | cyan 1 40 | cyan 1 40 |
| Fixing resin |  |  |  | fixing resin 43 | fixing resin 43 | fixing resin 43 | fixing resin 46 | fixing resin 47 |
|  |  |  | Amount added (solid fraction equivalent) | 5 | 5 | 5 | 5 | 5 |
| Organic solvent | Low SP value solvent | MB | SP = 10.9, BP = 158° C. | 10 |  |  |  |  |
|  |  | 1,2PD | SP = 13.5, BP = 188° C. |  | 5 | 15 | 25 | 25 |
|  |  | 1,2BD | SP = 12.7, BP = 194° C. | 10 |  |  |  |  |
|  |  | 1,2HexD | SP = 11.8, BP = 223° C. |  | 5 |  | 5 | 5 |
|  |  | 3Me1,5PenD | SP = 13.4, BP = 249° C. |  |  |  |  |  |
|  |  | iPDG | SP = 10.6, BP = 207° C. |  |  | 15 |  |  |
|  |  | BDG | SP = 10.5, BP = 231° C. | 15 | 10 |  | 5 | 5 |
|  |  | MPG | SP = 10.9, BP = 121° C. | 5 |  |  |  |  |
|  | Other solvent | 1,3BD | SP = 14.8, BP = 207° C. | 10 |  |  |  |  |
|  |  | DEG | SP = 15.0, BP = 244° C. |  |  |  |  |  |
|  |  | Gly | SP = 16.4, BP = 290° C. |  |  | 10 |  |  |
| Surfactant | Siloxane-based | General formula (3) | TEGO Wet 280 | 1.5 | 1.5 | 1.5 | 1.5 | 1.5 |
|  | Acetylene-based | General formula (6) | Surfynol104 | 1.5 | 1.5 | 1.5 |  |  |
|  | pH adjuster |  | Triethanolamine | 0.5 | 0.5 | 0.5 | 0.5 | 0.5 |
|  |  |  | Water | 16.5 | 21.5 | 21.5 | 18 | 18 |

|  |  |  |  | Comparative Example 3 | Comparative Example 4 | Comparative Example 5 | Comparative Example 6 |
|---|---|---|---|---|---|---|---|
|  |  | Ink No. |  | 78 | 79 | 80 | 81 |
| Pigment dispersion (pigment concentration: 10%) |  |  | Amount added | cyan 1 40 | cyan 1 40 | cyan 1 40 | cyan 1 40 |
| Fixing resin |  |  |  | fixing resin 48 | fixing resin 49 | fixing resin 50 | fixing resin 51 |
|  |  |  | Amount added (solid fraction equivalent) | 5 | 5 | 5 | 5 |
| Organic solvent | Low SP value solvent | MB | SP = 10.9, BP = 158° C. |  |  |  |  |
|  |  | 1,2PD | SP = 13.5, BP = 188° C. | 25 | 25 | 25 | 25 |
|  |  | 1,2BD | SP = 12.7, BP = 194° C. |  |  |  |  |
|  |  | 1,2HexD | SP = 11.8, BP = 223° C. | 5 | 5 | 5 | 5 |

TABLE 8-continued

|  |  |  |  |  |  |  |  |
|---|---|---|---|---|---|---|---|
|  |  | 3Me1,5PenD | SP = 13.4, BP = 249° C. |  |  |  |  |
|  |  | iPDG | SP = 10.6, BP = 207° C. |  |  |  |  |
|  |  | BDG | SP = 10.5, BP = 231° C. | 5 | 5 | 5 | 5 |
|  |  | MPG | SP = 10.9, BP = 121° C. |  |  |  |  |
|  | Other solvent | 1,3BD | SP = 14.8, BP = 207° C. |  |  |  |  |
|  |  | DEG | SP = 15.0, BP = 244° C. |  |  |  |  |
|  |  | Gly | SP = 16.4, BP = 290° C. |  |  |  |  |
| Surfactant | Siloxane-based | General formula (3) | TEGO Wet 280 | 1.5 | 1.5 | 1.5 | 1.5 |
|  | Acetylene-based | General formula (6) | Surfynol104 |  |  |  |  |
|  | pH adjuster |  | Triethanolamine | 0.5 | 0.5 | 0.5 | 0.5 |
|  | Water |  |  | 18 | 18 | 18 | 18 |

The abbreviations used in Tables 4 to 8 have the following meanings.
(Fixing Resins)
JDX6500: Joncryl JDX6500 (an aqueous solution of an acrylic water-soluble resin, manufactured by BASF Corporation, solid fraction: 29.5%, acid value: 74 mgKOH/g, Tg: 65° C.)
J734: Joncryl 734 (an acrylic emulsion, manufactured by BASF Corporation, solid fraction: 42%, acid value: 87 mgKOH/g, Tg: 30° C.)
AQ515: AQUACER 515 (a polyethylene wax emulsion, manufactured by BYK-Chemie GmbH, solid fraction: 35%)
NZ1004: HARDLEN NZ-1004 (a non-chlorinated polyolefin emulsion, manufactured by Toyobo Co., Ltd., solid fraction: 30%, acid value: 28 mgKOH/g)
(Low SP Value Solvents)
  MB: 3-methoxy-1-butanol
  1,2PD: 1,2-propanediol
  1,2BD: 1,2-butanediol
  1,2HexD: 1,2-hexanediol
  3Me1,5PenD: 3-methyl-1,5-pentanediol
  TPG: tripropylene glycol
  iPDG: diethylene glycol monoisopropyl ether
  BDG: diethylene glycol monobutyl ether
  MPG: propylene glycol monomethyl ether
(Other Solvents)
  1,3BD: 1,3-butanediol
  DEG: diethylene glycol
  Gly: glycerol
(Surfactants)
TEGO Wet 280: a siloxane-based surfactant represented by general formula (3) shown above, manufactured by Evonik Japan Co., Ltd.
BYK-333: a siloxane-based surfactant represented by general formula (5) shown above, manufactured by BYK-Chemie GmbH
TEGO Glide 440: a siloxane-based surfactant represented by general formula (5) shown above, manufactured by Evonik Japan Co., Ltd.
Surfynol 104: an acetylenediol-based surfactant represented by general formula (6) shown above, manufactured by Nissin Chemical Co., Ltd.
Surfynol DF110D: an acetylenediol-based surfactant represented by general formula (6) shown above, manufactured by Nissin Chemical Co., Ltd.

Surfynol 485: an acetylenediol-based surfactant that does not correspond with general formula (6) shown above, manufactured by Nissin Chemical Co., Ltd.
In Tables 4 to 8, the blend amounts for the fixing resins represent solid fraction equivalent values.
(Examples 1 to 75 and Comparative Examples 1 to 6)
Using the prepared inks 1 to 81, the evaluations described below were performed. The evaluations results were as shown in Tables 9 to 12.
(Evaluation 1: Evaluation of Ink Decap Properties)
An inkjet discharge apparatus was fitted with four heads manufactured by Kyocera Corporation (model: KJ4B-QA, design resolution: 600 dpi) arranged along the transport direction of the printing substrate, and the heads were filled with one of the magenta inks 1M to 81M. Following ink filling, a nozzle check pattern was printed (drop volume: 5 pL). Following confirmation that the ink was being discharged correctly from all of the nozzles, the inkjet discharge apparatus was placed in standby for a prescribed period, and a second nozzle check pattern was then printed. Using this nozzle check pattern, the decap properties were evaluated by confirming whether or not any nozzle misfires (a phenomenon where no ink is discharged from the nozzle) had occurred. The evaluation criteria were as follows, with evaluations of A to C representing practically usable levels.
A: even when printing was performed after standby of 3 hours, absolutely no nozzle misfires occurred
B: when printing was performed after standby of 2 hours, absolutely no nozzle misfires occurred, but when printing was performed after standby of 3 hours, one or more nozzle misfires occurred
C: when printing was performed after standby of 1 hour, absolutely no nozzle misfires occurred, but when printing was performed after standby of 2 hours, one or more nozzle misfires occurred
D: even when printing was performed after standby of 1 hour, nozzle misfires were noticeable
(Evaluation 2: Evaluation of Ink Discharge Stability)
After filling the inkjet discharge apparatus used in Evaluation 1 with the ink, a nozzle check pattern was printed (drop volume: 5 pL). Following confirmation that the ink was being discharged correctly from all of the nozzles, printing of a solid image having a print ratio of 100% was continued for a prescribed period in an atmosphere at 25° C., and a second nozzle check pattern was then printed. Using this nozzle check pattern, the discharge stability was evaluated by confirming whether or not any nozzle misfires had occurred. The evaluation criteria were as follows, with evaluations of AA to C representing practically usable levels.

AA: even the nozzle check pattern after 3 hours of continuous printing had absolutely no nozzle misfires A: the nozzle check pattern after 2 hours of continuous printing had absolutely no nozzle misfires, but in the nozzle check pattern after 3 hours of continuous printing, one or more nozzle misfires were noticeable B: the nozzle check pattern after 1 hour of continuous printing had absolutely no nozzle misfires, but in the nozzle check pattern after 2 hours of continuous printing, one or more nozzle misfires were noticeable C: the nozzle check pattern after 30 minutes of continuous printing had absolutely no nozzle misfires, but in the nozzle check pattern after 1 hour of continuous printing, one or more nozzle misfires were noticeable D: even in the nozzle check pattern after 30 minutes of continuous printing, one or more nozzle misfires were noticeable (Evaluation 3: Evaluation of Voids in Printed Matter)

The inkjet discharge apparatus used in Evaluation 1 was filled with black, cyan, magenta and yellow inks, in that order from the upstream side. Further, OK Top Coat+paper manufactured by Oji Holdings Corporation (a coated paper, grammage: 104.7 g/m$^2$) was prepared as the printing substrate.

The printing substrate was transported at a constant speed and passed beneath the heads. With the frequency set to 20 kHz and the print resolution set to 600×600 dpi, ink was discharged from each of the heads at various drop volumes, and an image was printed in which 5 cm×5 cm solid patches of each color, each having a print ratio of 100%, were arranged adjacent to one another. Following printing, the printed item was immediately placed in a 70° C. air oven and dried for 3 minutes, thus obtaining a solid patch printed item. An evaluation of voids in this printed matter was performed by inspecting the level of voids in the solid patch printed item under a magnifying glass and with the naked eye. The drop volume was set to either 10 pL or 12 pL.

The evaluation criteria were as follows, with evaluations of AA to C representing practically usable levels. The results shown in Tables 9 to 12 indicate only the result for the color that exhibited the worst result among the 4 colors that were evaluated.

AA: for the printed matter using a drop volume of 10 pL, no voids were visible under the magnifying glass or with the naked eye A: in the printed matter using a drop volume of 10 pL, some voids were noticeable under the magnifying glass, but no voids were visible with the naked eye. Further, for the printed matter using a drop volume of 12 pL, no voids were visible under the magnifying glass or with the naked eye B: in the printed matter using a drop volume of 10 pL, some voids were noticeable even with the naked eye, but for the printed matter using a drop volume of 12 pL, no voids were visible under the magnifying glass or with the naked eye C: in the printed matter using a drop volume of 12 pL, some voids were noticeable under the magnifying glass, but no voids were visible with the naked eye.

D: in the printed matter using a drop volume of 12 pL, some voids were noticeable even with the naked eye (Evaluation 4: Evaluation of Mixed Color Bleeding in Printed matter)

An inkjet discharge apparatus was fitted with two heads manufactured by Kyocera Corporation (model: KJ4B-QA, design resolution: 600 dpi) arranged along the transport direction of the printing substrate, and the heads were filled with a cyan ink and a yellow ink in that order from the upstream side. Further, OK Top Coat+paper manufactured by Oji Holdings Corporation (a coated paper, grammage: 104.7 g/m$^2$) was prepared as the printing substrate.

The printing substrate was transported at a constant speed and passed beneath the heads. With the frequency set to 20 kHz, the print resolution set to 600×600 dpi and the drop volume set to 5 pL, ink was discharged from each of the heads using various identical print ratios, and overprinting was used to print 5 cm×5 cm secondary color patches. Following printing, the printed item was immediately placed in a 70° C. air oven and dried for 3 minutes, thus obtaining a secondary color patch printed item. Mixed color bleeding in the printed matter was evaluated by visual inspection of the printed matter for the presence of mixed color bleeding at each of the print ratios. Four print ratios were used for the secondary color patches: 50% (overprinting of a 25% print ratio for each ink), 100% (overprinting of a 50% print ratio for each ink), 150% (overprinting of a 75% print ratio for each ink), and 200% (overprinting of a 100% print ratio for each ink).

The evaluation criteria were as follows, with evaluations of AA to C representing practically usable levels.

AA: even in the secondary color patch having a print ratio of 200%, no mixed color bleeding was observed A: no mixed color bleeding was observed in the secondary color patch having a print ratio of 150%, but some mixed color bleeding was observed in the secondary color patch having a print ratio of 200%

B: no mixed color bleeding was observed in the secondary color patch having a print ratio of 100%, but some mixed color bleeding was observed in the secondary color patch having a print ratio of 150%

C: no mixed color bleeding was observed in the secondary color patch having a print ratio of 50%, but some mixed color bleeding was observed in the secondary color patch having a print ratio of 100%

D: even in the secondary color patch having a print ratio of 50%, mixed color bleeding was observed (Evaluation 5: Evaluation of Water Resistance of Printed Matter)

Using the solid patch printed matter printed at a drop volume of 12 pL in Evaluation 3, the solid patch portion of the printed matter was rubbed with a cotton swab that had been soaked in water, and the resulting state was inspected visually to evaluate the water resistance. The evaluation criteria were as follows, with evaluations of A to C representing practically usable levels. The results shown in Tables 9 to 12 indicate only the result for the color that exhibited the worst result among the 4 colors that were evaluated.

A: even when rubbed 15 times with a cotton swab soaked in water, no detachment of the printed matter and no adhesion of the ink to the cotton swab occurred.

B: when rubbed 10 times with a cotton swab soaked in water, no peeling of the printed matter and no adhesion of the ink to the cotton swab occurred, but when rubbed 15 times, either some detachment of the printed matter or some adhesion of the ink to the cotton swab was observed C: when rubbed 5 times with a cotton swab soaked in water, no peeling of the printed matter and no adhesion of the ink to the cotton swab occurred, but when rubbed 10 times, either some detachment of the printed matter or some adhesion of the ink to the cotton swab was observed D: when rubbed 5 times strongly with a cotton swab soaked in water, some detachment of the printed matter or some adhesion of the ink to the cotton swab was observed (Evaluation 6: Evaluation of Rub Fastness of Printed Matter)

Using the solid patch printed matter printed at a drop volume of 12 pL in Evaluation 3, the solid patch portion of the printed matter was rubbed strongly with a finger, and the resulting state was inspected visually to evaluate the rub fastness. The evaluation criteria were as follows, with evaluations of AA to C representing practically usable levels. The results shown in Tables 9 to 12 indicate only the result for the color that exhibited the worst result among the 4 colors that were evaluated.

AA: even when rubbed strongly 30 times with a finger, no peeling of the printed matter and no exposure of the substrate occurred A: when rubbed strongly 20 times with a finger, no peeling of the printed matter and no exposure of the substrate occurred, but when rubbed 30 times, some peeling of the printed matter or exposure of the substrate was observed B: when rubbed strongly 15 times with a finger, no peeling of the printed matter and no exposure of the substrate occurred, but when rubbed 20 times, some peeling of the printed matter or exposure of the substrate was observed C: when rubbed strongly 10 times with a finger, no peeling of the printed matter and no exposure of the substrate occurred, but when rubbed 15 times, some peeling of the printed matter or exposure of the substrate was observed D: when rubbed strongly 10 times with a finger, some peeling of the printed matter or exposure of the substrate was observed (Evaluation 7: Evaluation of Ink Storage Stability)

For each color of each of the inks 1 to 81, a Nanotrac UPA-EX150 manufactured by MicrotracBEL Corporation was used to measure the volume average particle size (D50) of the pigment. The ink was then placed in a sealed container, and after storage in a thermostatic chamber at 70° C. for two weeks to accelerate any change over time, the above device was then used to remeasure the viscosity, and the storage stability of the ink was evaluated by calculating the change in the volume average particle size of the pigment in the ink over the storage period. The evaluation criteria were as follows, with evaluations of A to C representing practically usable levels. The results shown in Tables 9 to 12 indicate only the result for the color that exhibited the worst result among the 4 colors that were evaluated.

A: the change in volume average particle size was less than ±10%.

B: the change in volume average particle size was at least ±10%, but less than ±20%

C: the change in volume average particle size was at least ±20%, but less than ±30%

D: the change in viscosity after storage for one week was at least ±30%

TABLE 9

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Evaluation results | Evaluation 1 | Decap properties | B | B | B | C | C | B | B | B | B | B |
| | Evaluation 2 | Discharge stability | B | B | B | C | C | B | B | B | B | B |
| | Evaluation 3 | Voids | B | B | C | C | B | B | B | B | B | B |
| | Evaluation 4 | Mixed color bleeding | B | C | C | C | B | B | B | B | C | B |
| | Evaluation 5 | Water resistance | B | B | C | B | B | B | C | C | B | B |
| | Evaluation 6 | Rub fastness | B | B | B | B | B | B | B | C | B | B |
| | Evaluation 7 | Storage stability | A | A | A | A | A | A | A | A | A | A |

| | | | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Evaluation results | Evaluation 1 | Decap properties | B | C | B | B | B | B | B | B | B | B |
| | Evaluation 2 | Discharge stability | B | B | B | B | B | B | C | B | B | B |
| | Evaluation 3 | Voids | B | C | B | B | B | B | B | B | B | B |
| | Evaluation 4 | Mixed color bleeding | B | B | C | C | B | B | B | B | B | B |
| | Evaluation 5 | Water resistance | B | C | B | B | B | B | B | B | B | B |
| | Evaluation 6 | Rub fastness | B | B | C | B | B | B | A | A | A | A |
| | Evaluation 7 | Storage stability | A | A | A | A | A | A | B | A | A | A |

TABLE 10

| | | | Example 21 | Example 22 | Example 23 | Example 24 | Example 25 | Example 26 | Example 27 | Example 28 | Example 29 | Example 30 |
|---|---|---|---|---|---|---|---|---|---|---|---|---|
| Evaluation results | Evaluation 1 | Decap properties | B | B | B | B | B | B | C | B | C | C |
| | Evaluation 2 | Discharge stability | B | B | B | C | C | B | B | B | B | C |
| | Evaluation 3 | Voids | B | B | B | B | B | B | B | B | B | B |
| | Evaluation 4 | Mixed color bleeding | B | B | B | B | B | B | B | B | B | B |
| | Evaluation 5 | Water resistance | B | B | B | B | B | B | B | B | B | B |
| | Evaluation 6 | Rub fastness | B | C | B | C | B | B | B | B | B | B |
| | Evaluation 7 | Storage stability | A | A | A | C | C | B | B | A | B | C |

| | | | Example 31 | Example 32 | Example 33 | Example 34 | Example 35 | Example 36 | Example 37 | Example 38 | Example 39 | Example 40 |
|---|---|---|---|---|---|---|---|---|---|---|---|---|
| Evaluation results | Evaluation 1 | Decap properties | C | B | B | B | B | B | B | B | B | B |
| | Evaluation 2 | Discharge stability | B | C | B | B | B | B | B | B | B | B |
| | Evaluation 3 | Voids | B | B | B | B | B | A | A | A | B | B |
| | Evaluation 4 | Mixed color bleeding | B | B | B | A | A | AA | AA | AA | B | B |
| | Evaluation 5 | Water resistance | B | B | B | B | B | B | B | B | A | B |
| | Evaluation 6 | Rub fastness | B | B | C | C | C | B | A | A | A | A |
| | Evaluation 7 | Storage stability | A | C | A | A | A | A | A | A | A | A |

TABLE 11

| | | | Example 41 | Example 42 | Example 23 | Example 44 | Example 45 | Example 46 | Example 47 | Example 48 | Example 49 | Example 50 |
|---|---|---|---|---|---|---|---|---|---|---|---|---|
| Evaluation results | Evaluation 1 | Decap properties | B | B | B | B | B | B | B | B | C | C |
| | Evaluation 2 | Discharge stability | B | B | B | B | B | B | B | B | B | C |
| | Evaluation 3 | Voids | B | B | A | A | A | B | B | B | B | B |
| | Evaluation 4 | Mixed color bleeding | B | A | AA | AA | AA | B | B | B | B | B |
| | Evaluation 5 | Water resistance | B | A | A | A | A | B | B | B | B | B |
| | Evaluation 6 | Rub fastness | C | A | A | A | A | C | B | B | B | B |
| | Evaluation 7 | Storage stability | B | A | A | A | A | A | A | A | A | A |

| | | | Example 51 | Example 52 | Example 53 | Example 54 | Example 55 | Example 56 | Example 57 | Example 58 | Example 59 | Example 60 |
|---|---|---|---|---|---|---|---|---|---|---|---|---|
| Evaluation results | Evaluation 1 | Decap properties | B | B | C | C | C | B | B | B | B | B |
| | Evaluation 2 | Discharge stability | B | B | C | B | B | B | B | B | B | C |
| | Evaluation 3 | Voids | B | B | B | B | B | B | B | B | B | C |
| | Evaluation 4 | Mixed color bleeding | B | B | B | B | B | A | A | B | B | C |
| | Evaluation 5 | Water resistance | B | A | A | B | A | A | A | A | A | B |
| | Evaluation 6 | Rub fastness | B | A | A | AA | AA | A | A | A | B | B |
| | Evaluation 7 | Storage stability | B | A | A | A | A | A | A | A | A | A |

TABLE 12

| | | | Example 61 | Example 62 | Example 63 | Example 64 | Example 65 | Example 66 | Example 67 | Example 68 | Example 69 |
|---|---|---|---|---|---|---|---|---|---|---|---|
| Evaluation results | Evaluation 1 | Decap properties | B | B | B | B | B | B | C | A | A |
| | Evaluation 2 | Discharge stability | B | B | A | A | B | A | B | AA | A |
| | Evaluation 3 | Voids | B | B | AA | AA | A | AA | B | AA | AA |
| | Evaluation 4 | Mixed color bleeding | A | A | B | B | B | B | B | AA | AA |
| | Evaluation 5 | Water resistance | B | B | B | B | B | B | A | A | A |
| | Evaluation 6 | Rub fastness | B | B | B | B | B | B | A | A | A |
| | Evaluation 7 | Storage stability | A | A | A | A | A | A | A | A | B |

| | | | Example 70 | Example 71 | Example 72 | Example 73 | Example 74 | Example 75 | Comparative Example 1 |
|---|---|---|---|---|---|---|---|---|---|
| Evaluation results | Evaluation 1 | Decap properties | B | B | C | B | B | B | D |
| | Evaluation 2 | Discharge stability | AA | AA | B | AA | A | A | D |
| | Evaluation 3 | Voids | AA | AA | A | AA | AA | AA | B |
| | Evaluation 4 | Mixed color bleeding | AA | AA | AA | AA | A | AA | D |
| | Evaluation 5 | Water resistance | A | A | A | A | A | A | B |
| | Evaluation 6 | Rub fastness | A | A | A | A | C | A | B |
| | Evaluation 7 | Storage stability | A | A | B | A | A | B | B |

| | | | Comparative Example 2 | Comparative Example 3 | Comparative Example 4 | Comparative Example 5 | Comparative Example 6 |
|---|---|---|---|---|---|---|---|
| Evaluation results | Evaluation 1 | Decap properties | B | C | C | C | D |
| | Evaluation 2 | Discharge stability | B | C | B | B | C |
| | Evaluation 3 | Voids | C | B | D | D | C |
| | Evaluation 4 | Mixed color bleeding | D | D | B | B | D |
| | Evaluation 5 | Water resistance | B | B | D | D | B |
| | Evaluation 6 | Rub fastness | B | B | C | C | B |
| | Evaluation 7 | Storage stability | B | A | A | A | B |

As illustrated in Tables 9 to 12, the water-based ink for an inkjet that represents an embodiment of the present invention is able to produce high-quality images that display no voids or mixed color bleeding and exhibit superior water resistance and rub fastness, even on low-absorption substrates such as coated papers, and also exhibits excellent decap properties, discharge stability and storage stability.

The invention claimed is:

1. A water-based ink for an inkjet comprising a pigment, a fixing resin, an organic solvent and water, wherein
the fixing resin comprises an A-B block polymer having an A block and a B block,
the A block contains a structural unit (P-1) having an anionic functional group,
the A block and the B block are each, independently, a block containing one type of polymer selected from among a styrene-based polymer, a (meth)acrylic-based polymer and a styrene-(meth)acrylic-based polymer,
an amount of structural units contained in the A block is 5 to 25 mol % of a total molar amount of structural units contained in the A-B block polymer,
an amount of the structural unit (P-1) having an anionic functional group contained in the A block is at least 85 mol % of a total molar amount of the structural unit (P-1) having an anionic functional group contained in the A-B block polymer,
the acid value of the A-B block polymer is from 5 to 80 mgKOH/g, and
a glass transition temperature (TgB) of the B block is from 70 to 100° C.

2. The water-based ink for an inkjet according to claim 1, wherein an amount of the structural unit (P-1) having an anionic functional group contained in the A block is from 40 to 80% by weight of all the structural units contained in the A block.

3. The water-based ink for an inkjet according to claim 1, wherein the B block contains a structural unit (P-2) having an alkyl group of 8 to 30 carbon atoms and/or a structural unit (P-3) having an aromatic ring.

4. The water-based ink for an inkjet according to claim 3, wherein the B block contains a structural unit having an alkyl group of 10 to 30 carbon atoms as the structural unit (P-2) having an alkyl group of 8 to 30 carbon atoms.

5. The water-based ink for an inkjet according to claim 3, wherein the B block contains a styrene-based structure as the structural unit (P-3) having an aromatic ring.

6. The water-based ink for an inkjet according to claim 1, wherein the organic solvent comprises a glycol ether and/or a 1,2-alkanediol of 3 or more carbon atoms.

7. The water-based ink for an inkjet according to claim 1, further comprising a surfactant, wherein the surfactant comprises a siloxane-based surfactant.

8. A method for producing printed matter that comprises printing the water-based ink for an inkjet according to claim 1 onto a substrate.

9. Printed matter produced using the method for producing printed matter according to claim 8.

* * * * *